US011140714B2

(12) United States Patent
Rico Alvarino et al.

(10) Patent No.: US 11,140,714 B2
(45) Date of Patent: Oct. 5, 2021

(54) PRACH AND/OR SRS SWITCHING ENHANCEMENTS

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US); Hao Xu, San Diego, CA (US); Jing Sun, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 22 days.

(21) Appl. No.: 15/619,094

(22) Filed: Jun. 9, 2017

(65) Prior Publication Data

US 2018/0098358 A1    Apr. 5, 2018

Related U.S. Application Data

(60) Provisional application No. 62/402,915, filed on Sep. 30, 2016.

(51) Int. Cl.
H04W 74/08 (2009.01)
H04L 5/00 (2006.01)
(Continued)

(52) U.S. Cl.
CPC ......... H04W 74/0833 (2013.01); H04L 5/001 (2013.01); H04L 5/0048 (2013.01);
(Continued)

(58) Field of Classification Search
CPC ............. H04W 74/0833; H04W 52/34; H04W 72/0453; H04W 72/042; H04W 52/325;
(Continued)

(56) References Cited

U.S. PATENT DOCUMENTS

2012/0235799 A1    9/2012   Yamasaki
2012/0236799 A1*   9/2012   Dai ...................... H04W 52/42
                                                          370/328
(Continued)

FOREIGN PATENT DOCUMENTS

WO    2010124228 A2    10/2010
WO    2012044846 A1     4/2012

OTHER PUBLICATIONS

International Search Report and Written Opinion—PCT/US2017/054091—ISA/EPO—dated Dec. 13, 2017.
(Continued)

Primary Examiner — Alex Skripnikov
Assistant Examiner — Sharmin Chowdhury
(74) Attorney, Agent, or Firm — Qualcomm Incorporated

(57) ABSTRACT

Certain aspects of the disclosure relate to techniques and apparatus for improving random access for SRS switching in a wireless network. Prior to transmitting a SRS, a UE may interrupt communication on a first carrier to switch from the first carrier to a second carrier to transmit a PRACH. To reduce interruption to the first carrier, the UE may use the beginning symbol(s) of a UpPTS on the second carrier to transmit the PRACH. In addition, to reduce interruption to the first carrier, the UE may monitor for another PDCCH order before transmitting another PRACH. Further, aspects of the present disclosure provide techniques and apparatus for jointly triggering SRS transmissions and performing power control for SRS transmissions. A BS may trigger SRS transmissions from multiple UEs, trigger SRS transmissions from multiple carriers from the same UE at the same time and/or perform power control separately for each carrier.

36 Claims, 17 Drawing Sheets

(51) Int. Cl.
*H04W 52/32* (2009.01)
*H04W 72/04* (2009.01)
*H04W 52/34* (2009.01)

(52) U.S. Cl.
CPC .......... *H04L 5/0051* (2013.01); *H04L 5/0053* (2013.01); *H04L 5/0092* (2013.01); *H04L 5/0096* (2013.01); *H04W 52/325* (2013.01); *H04W 52/34* (2013.01); *H04W 72/042* (2013.01); *H04W 72/0453* (2013.01)

(58) Field of Classification Search
CPC ..... H04L 5/001; H04L 5/0053; H04L 5/0051; H04L 5/0092; H04L 5/0096; H04L 5/0048
See application file for complete search history.

(56) References Cited

U.S. PATENT DOCUMENTS

| | | | |
|---|---|---|---|
| 2012/0257582 A1* | 10/2012 | Damnjanovic | H04L 5/001 370/329 |
| 2013/0016705 A1 | 1/2013 | Zhang et al. | |
| 2013/0083710 A1 | 4/2013 | Chen et al. | |
| 2013/0156014 A1 | 6/2013 | Kim et al. | |
| 2013/0176919 A1 | 7/2013 | Pan et al. | |
| 2013/0188612 A1 | 7/2013 | Dinan | |
| 2014/0126556 A1 | 5/2014 | Tiirola et al. | |
| 2015/0023231 A1 | 1/2015 | Ji et al. | |
| 2015/0181533 A1 | 6/2015 | Chen et al. | |
| 2015/0358917 A1* | 12/2015 | Gao | H04W 52/54 455/522 |
| 2016/0014802 A1 | 1/2016 | Yang et al. | |
| 2016/0165640 A1 | 6/2016 | Yang et al. | |
| 2016/0227491 A1 | 8/2016 | Park et al. | |
| 2016/0330680 A1 | 11/2016 | Yi et al. | |
| 2017/0251375 A1 | 8/2017 | Yang et al. | |
| 2017/0251461 A1* | 8/2017 | Parkvall | H04W 72/1289 |
| 2017/0264402 A1* | 9/2017 | Papasakellariou | H04W 52/242 |
| 2017/0302419 A1* | 10/2017 | Liu | H04L 5/0078 |
| 2018/0098357 A1 | 4/2018 | Rico Alvarino et al. | |
| 2018/0098358 A1 | 4/2018 | Rico Alvarino et al. | |
| 2018/0115965 A1* | 4/2018 | Takeda | H04L 5/0016 |
| 2018/0317252 A1 | 11/2018 | Li et al. | |
| 2019/0081757 A1* | 3/2019 | Yang | H04L 5/001 |
| 2019/0173534 A1 | 6/2019 | Kakishima et al. | |

OTHER PUBLICATIONS

Huawei et al., "Corrections to Handover Requirements", 3GPP Draft; R4-082130, 3rd Generation Partnership Project (3GPP), Mobile Competence Centre, 650, Route Des Lucioles, F-06921, Sophia-Anti Polis Cedex, France, vol. RAN WG4, No. Jeju; Aug. 26, 2008, Aug. 26, 2008, XP050180614, [retrieved on Aug. 26, 2008], sections 5.1.2.1.2. 5.2.2.4.2, 9 pages.

* cited by examiner

PRACH AND/OR SRS SWITCHING ENHANCEMENTS

INTRODUCTION

This application claims the benefit of U.S. Provisional Patent Application Ser. No. 62/402,915, filed Sep. 30, 2016, which is assigned to the assignee hereof and hereby expressly incorporated by reference herein.

BACKGROUND

I. Field of the Disclosure

Aspects of the present disclosure relate generally to wireless communications systems, and more particularly, to methods and apparatus for physical random access channel (PRACH) and/or sounding reference signal (SRS) switching enhancements, for example, methods and apparatus for transmitting PRACH for SRS switching between component carriers.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, eNB, gNB, access point (AP), radio head, transmission reception point (TRP), new radio (NR) BS, 5G Node B, etc.).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

In some networks (e.g., LTE), a UE can be configured with multiple component carriers (CCs) for carrier aggregation. Each CC can be configured for uplink only transmission, downlink only transmission, or both uplink and downlink transmission. For CCs supporting both uplink and downlink, transmit diversity based feedback (e.g., with SRS) is beneficial as channel reciprocity can be used (e.g., by the BS) to estimate the downlink channel based on the feedback. However, the UE may be capable of aggregating a larger number of downlink CCs than uplink CCs. As a result, if the UE is restricted to transmitting SRS in the configured uplink CCs, there may be some CCs with downlink transmission for the UE that may not have an uplink transmission with SRS, and, thus, transmit diversity based feedback for these carriers based on the channel reciprocity between uplink and downlink may not be available.

In such situations, some networks may support SRS switching to and between CCs to allow the UE to transmit SRS on configured downlink (e.g., non-configured uplink) CCs in order to exploit channel reciprocity. SRS switching, in general, may involve interrupting communication on a CC, switching/re-tuning to a different CC to transmit SRS, and switching/retuning back to the CC after transmitting SRS.

Additionally, the UE may not have a valid timing advance (TA) for the SRS transmission on the downlink CC (e.g., the downlink CC may belong to a different TA group (TAG) than that of other CCs configured for the UE). In such cases, the UE may attempt to transmit a PRACH on the downlink CC in order to obtain an initial TA estimate for the transmission of SRS. However, the transmission of PRACH on the downlink CC may also interrupt communication on another CC (e.g., similar to the transmission of SRS). This additional interruption due to PRACH transmission(s) can have a significant impact on the throughput and communications in the other CC. Accordingly, techniques for improving the random access procedure, for example, for SRS switching may be desirable.

Further, in general, the UE can be triggered to transmit SRS in a periodic manner or aperiodic manner. However, such conventional triggering mechanisms are generally not capable of jointly triggering SRS transmissions and performing power control for the SRS transmissions. Accordingly, techniques for jointly triggering SRS transmissions and performing power control for the SRS transmissions may be desirable.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to one or more enhancements for PRACH and/or SRS switching in a wireless network.

In certain aspects, techniques presented herein can improve the random access procedure for SRS switching by enabling the UE to transmit a PRACH in the beginning (or first) symbols of an uplink pilot time slot (UpPTS) of a special subframe. For example, in some networks, the UpPTS can be used for up to six symbols, and a two to four symbol PRACH may be sufficient to enable the BS to determine the TA estimate. The UE may determine which symbols of UpPTS to use for the PRACH transmission based on a configuration or indication from the BS. In one aspect, the BS can configure the UE to transmit a PRACH in the first symbols (e.g., at least first two symbols) of UpPTS. In one aspect, the BS can configure the UE to transmit a PRACH in one or more symbols of UpPTS excluding one or more of the last symbols (e.g., last two symbols) of UpPTS.

The UE may interrupt communication on a first CC to switch from the first CC to a second CC. After switching to the second CC, the UE may transmit a PRACH in the UpPTS based on the configuration (or indication) received from the BS. By configuring the UE to transmit PRACH in the first symbols of UpPTS, aspects presented herein can reduce the impact of switching/interruptions on a (e.g., first) CC due to the PRACH transmission on another (e.g., second downlink only) CC for SRS.

Certain aspects of the present disclosure provide a method for wireless communication that may be performed, for example, by a user equipment (UE). The method generally includes determining, based on one or more conditions, whether to use one or more symbols of an uplink pilot time slot (UpPTS) for transmission of a PRACH to a base station (BS). The method also includes interrupting communication on a first component carrier (CC) to switch from the first CC to a second CC. The method further includes, after switching to the second CC, transmitting the PRACH in the UpPTS based on the determination.

Certain aspects of the present disclosure provide an apparatus for wireless communication, such as a UE. The apparatus generally includes means for determining, based on one or more conditions, whether to use one or more symbols of a UpPTS for transmission of a PRACH to a BS. The apparatus also includes means for interrupting communication on a first CC to switch from the first CC to a second CC. The apparatus further includes means for, after switching to the second CC, transmitting the PRACH in the UpPTS based on the determination.

Certain aspects of the present disclosure provide an apparatus for wireless communication, such as a UE. The apparatus generally includes at least one processor and a memory coupled to the at least one processor. The at least one processor is configured to determine, based on one or more conditions, whether to use one or more symbols of a UpPTS for transmission of a PRACH to a BS. The at least one processor is also configured to interrupt communication on a first component carrier (CC) to switch from the first CC to a second CC. The at least one processor is further configured to, after switching to the second CC, transmit the PRACH in the UpPTS based on the determination.

Certain aspects of the present disclosure provide a computer readable medium having computer executable code stored thereon for wireless communication that may be performed, for example, by a UE. The computer executable code generally includes code for determining, based on one or more conditions, whether to use one or more symbols of a UpPTS for transmission of a PRACH to a BS, code for interrupting communication on a first CC to switch from the first CC to a second CC, and code for, after switching to the second CC, transmitting the PRACH in the UpPTS based on the determination.

Certain aspects of the present disclosure provide a method for wireless communication that may be performed, for example, by a base station (BS). The method generally includes determining, based on one or more conditions, whether to configure a UE to use one or more symbols of a UpPTS for transmission of a PRACH to the BS. The method also includes transmitting an indication of the determination to the UE. The method further includes receiving from the UE the PRACH in the UpPTS.

Certain aspects of the present disclosure provide an apparatus for wireless communication, such as a BS. The apparatus generally includes means for determining, based on one or more conditions, whether to configure a UE to use one or more symbols of a UpPTS for transmission of a PRACH to the apparatus. The apparatus also includes means for transmitting an indication of the determination to the UE. The apparatus further includes means for receiving from the UE the PRACH in the UpPTS.

Certain aspects of the present disclosure provide an apparatus for wireless communication, such as a BS. The apparatus generally includes at least one processor and a memory coupled to the at least one processor. The at least one processor is configured to determine, based on one or more conditions, whether to configure a UE to use one or more symbols of a UpPTS for transmission of a PRACH to the apparatus. The at least one processor is also configured to transmit an indication of the determination to the UE. The at least one processor is further configured to receive from the UE the PRACH in the UpPTS.

Certain aspects of the present disclosure provide a computer readable medium having computer executable code stored thereon for wireless communication that may be performed, for example, by a BS. The computer executable code generally includes code for determining, based on one or more conditions, whether to configure a UE to use one or more symbols of a UpPTS for transmission of a PRACH to the BS, code for transmitting an indication of the determination to the UE, and code for receiving from the UE the PRACH in the UpPTS.

In certain aspects, techniques presented herein may modify the conventional random access procedure in order to reduce the impact of switching/interruptions on a (e.g., first) CC due to PRACH transmission on another (e.g., second downlink only) CC. For example, the UE may monitor for a physical downlink control channel (PDCCH) order from the BS for a PRACH transmission. The PDCCH order may include resource allocation information for the PRACH transmission. After the UE transmits the PRACH, the UE may monitor for a random access response (RAR) from the BS. If the RAR is not detected (indicating that the PRACH attempt may have been unsuccessful), the UE may wait to receive confirmation from the BS before transmitting another PRACH. That is, if the RAR is not detected by the UE, the UE may monitor for another PDDCH order before transmitting the next PRACH, as opposed to automatically repeating the PRACH transmission as in conventional random access procedures. By having the UE monitor for another PDCCH order before transmitting successive PRACHs, aspects presented herein can reduce the impact of repeated switching/interruptions on a (e.g., first) CC due to successive PRACH transmissions on another (e.g., second downlink only) CC for SRS.

Certain aspects of the present disclosure provide a method for wireless communication that may be performed, for example, by a UE. The method generally includes monitoring for a first PDCCH order for a first PRACH transmission. The method also includes determining a transmit power for the first PRACH transmission, based on an indicator received in the first PDCCH order or a retransmission index of the first PRACH transmission. The method further includes transmitting the first PRACH at the determined transmit power. The method further yet includes, after transmitting the first PRACH, monitoring for a second PDCCH order before transmitting a second PRACH.

Certain aspects of the present disclosure provide an apparatus for wireless communication, such as a UE. The apparatus generally includes means for monitoring for a first PDCCH order for a first PRACH transmission and means for determining a transmit power for the first PRACH transmission, based on an indicator received in the first PDCCH order or a retransmission index of the first PRACH transmission. The apparatus also includes means for transmitting the first PRACH at the determined transmit power. The apparatus further includes means for, after transmitting the first PRACH, monitoring for a second PDCCH order before transmitting a second PRACH.

Certain aspects of the present disclosure provide an apparatus for wireless communication, such as a UE. The apparatus generally includes at least one processor and a memory coupled to the at least one processor. The at least one processor is configured to monitor for a first PDCCH order for a first PRACH transmission and determine a transmit power for the first PRACH transmission, based on an indicator received in the first PDCCH order or a retransmission index of the first PRACH transmission. The at least one processor is also configured to transmit the first PRACH at the determined transmit power. The at least one processor is further configured to, after transmitting the first PRACH, monitor for a second PDCCH order before transmitting a second PRACH.

Certain aspects of the present disclosure provide a computer readable medium having computer executable code stored thereon for wireless communication that may be performed, for example, by a UE. The computer executable code generally includes code for monitoring for a first PDCCH order for a first PRACH transmission, code for determining a transmit power for the first PRACH transmission, based on an indicator received in the first PDCCH order or a retransmission index of the PRACH transmission, code for transmitting the first PRACH at the determined transmit power, and code for, after transmitting the first PRACH, monitoring for a second PDCCH order before transmitting a second PRACH.

Certain aspects of the present disclosure provide improved techniques for jointly triggering SRS transmissions and performing power control for the SRS transmissions. A BS may identify multiple CCs that are available for UEs to use for SRS transmissions to the BS. The BS may configure a set of SRS trigger groups that each include one or more of the multiple CCs the UE is to use for SRS transmissions. The BS may signal an indication of the configuration to the UE. Thus, using the techniques described herein, a BS may trigger SRS transmissions from multiple UEs, trigger SRS transmissions from multiple CCs from the same UE at the same time, and/or perform power control separately for SRS transmissions from each CC configured for a UE. As such, these techniques can provide increased flexibility and reduced overhead for configuring SRS transmissions (with power control) for a UE, compared to traditional SRS triggering mechanisms.

Certain aspects of the present disclosure provide a method for wireless communication that may be performed, for example, by a BS. The method generally includes identifying a plurality of CCs available for at least one UE to use for SRS transmissions to the BS. The method also includes determining a configuration specifying one or more CCs from the plurality of CCs the at least one UE is to use for SRS transmissions. The method further includes signaling an indication of the configuration to the at least one UE.

Certain aspects of the present disclosure provide an apparatus for wireless communication, such as a BS. The apparatus generally includes means for identifying a plurality of CCs available for at least one UE to use for SRS transmissions to the apparatus. The apparatus also includes means for determining a configuration specifying one or more CCs from the plurality of CCs the at least one UE is to use for SRS transmissions. The apparatus further includes means for signaling an indication of the configuration to the at least one UE.

Certain aspects of the present disclosure provide an apparatus for wireless communication, such as a BS. The apparatus generally includes at least one processor and a memory coupled to the at least one processor. The at least one processor is configured to identify a plurality of CCs available for at least one UE to use for SRS transmissions to the apparatus. The at least one processor is also configured to determine a configuration specifying one or more CCs from the plurality of CCs the at least one UE is to use for SRS transmissions. The at least one processor is further configured to signal an indication of the configuration to the at least one UE.

Certain aspects of the present disclosure provide a computer readable medium having computer executable code stored thereon for wireless communication that may be performed, for example, by a BS. The computer executable code generally includes code for identifying a plurality of CCs available for at least one UE to use for SRS transmissions to the BS, code for determining a configuration specifying one or more CCs from the plurality of CCs the at least one UE is to use for SRS transmissions, and code for signaling an indication of the configuration to the at least one UE.

Certain aspects of the present disclosure provide a method for wireless communication that may be performed, for example, by a UE. The method generally includes receiving a trigger to transmit a SRS on each CC of a group of one or more CCs to one or more corresponding BSs. The method also includes transmitting SRSs to the BSs in response to the trigger.

Certain aspects of the present disclosure provide an apparatus for wireless communication, such as a UE. The apparatus generally includes means for receiving a trigger to transmit a SRS on each CC of a group of one or more CCs to one or more corresponding BSs. The apparatus also includes means for transmitting SRSs to the BSs in response to the trigger.

Certain aspects of the present disclosure provide an apparatus for wireless communication, such as a UE. The apparatus generally includes at least one processor and a memory coupled to the at least one processor. The at least one processor is configured to receive a trigger to transmit a SRS on each CC of a group of one or more CCs to one or more corresponding BSs. The at least one processor is also configured to transmit SRSs to the BSs in response to the trigger.

Certain aspects of the present disclosure provide a computer readable medium having computer executable code stored thereon for wireless communication that may be performed, for example, by a UE. The computer executable code generally includes code for receiving a trigger to transmit a SRS on each CC of a group of one or more CCs to one or more corresponding BSs, and code for transmitting SRSs to the BSs in response to the trigger.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
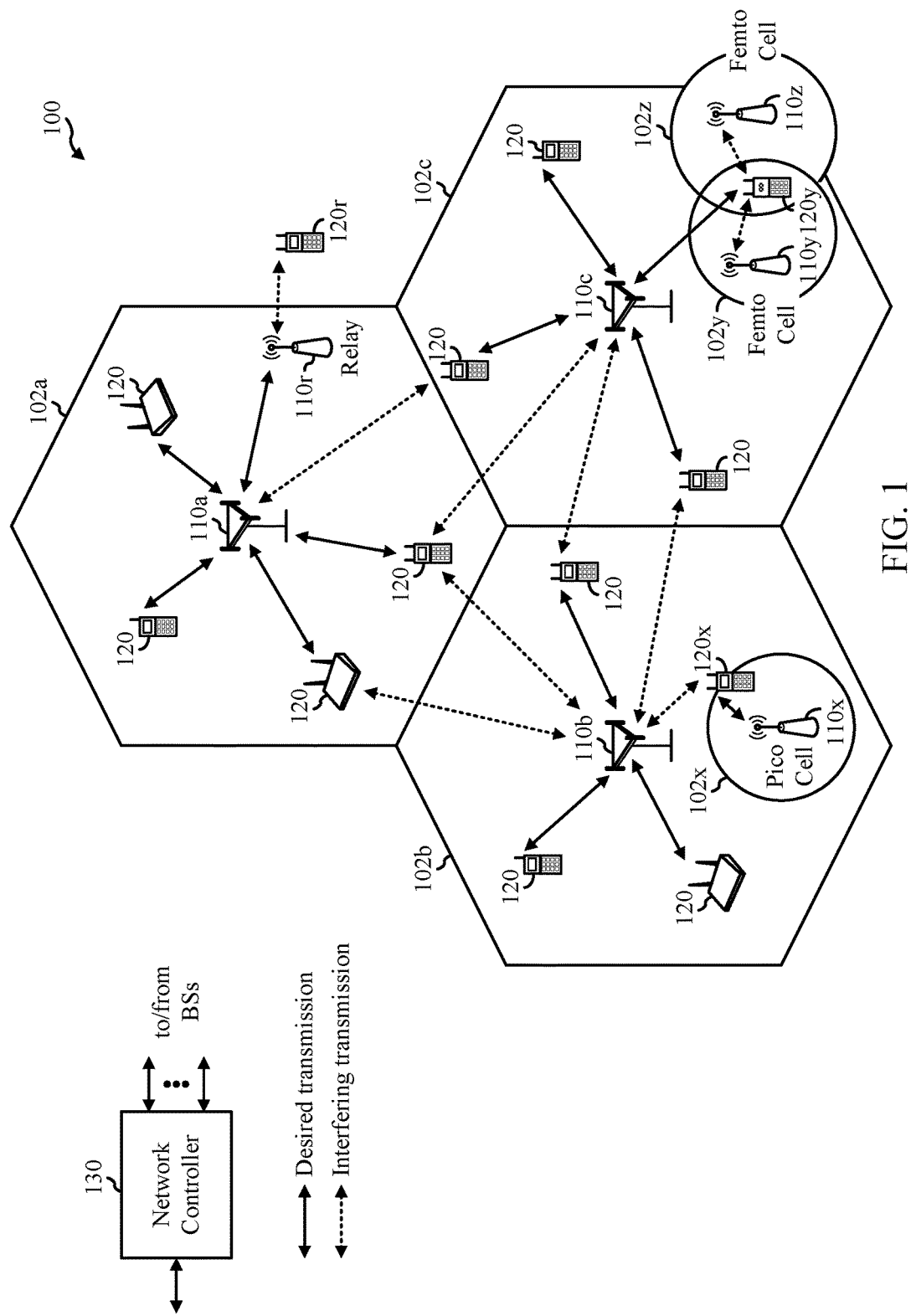
FIG. 1 is a block diagram conceptually illustrating an example telecommunications system, in accordance with certain aspects of the present disclosure.

Aspects of the present disclosure provide techniques and apparatus for enhancing PRACH transmissions for SRS switching situations.

Typically, in cases where UE is configured with one or more downlink only CCs, etc., the UE may perform SRS switching to and between downlink CCs in order to transmit SRS in (e.g., the inactive UL subframes) on the downlink CCs. The SRS transmissions may enable the BS to exploit channel reciprocity between the uplink and downlink when estimating the downlink channel quality based on the SRS. In many cases, however, the UE may have a limited number of transmit chains (e.g., the UE may have a single transmit chain), and therefore, SRS switching may involve the UE switching between transmissions on one (e.g., first) CC to SRS transmission on a different (e.g., downlink only) CC, and then back to the first CC. This switching may impact (e.g., interrupt) communications on the first CC.

Additionally, before the UE attempts to transmit SRS on a given CC, the UE may need a valid timing advance (TA) for that CC. However, in cases where the downlink only CC does not belong to the same timing advance group (TAG) as another CC that is configured for uplink, the UE may not have an initial TA for the downlink only CC. In such cases, the UE may attempt to perform a random access procedure in order to obtain the TA for the downlink only CC to use for SRS transmissions on the downlink only CC. However, if the UE has a limited number of transmit chains, the UE may also have to interrupt communication on a (e.g., first) CC in order to transmit PRACH on the downlink only CC (e.g., in a similar manner as SRS switching). Such interruption to the (e.g., first) CC due to the PRACH transmission can have a significant impact on the throughput, communications, etc., in the first CC. For example, the interruption due to PRACH transmission may create additional interruption(s) in the previous and/or subsequent subframes in the first CC.

Further, in some cases, initiating a random access procedure on the downlink-only CC based on a legacy (or conventional) random access procedure can be inefficient and cause numerous interruptions in the first CC. For example, a UE using a legacy random access procedure may automatically attempt to repeat PRACH transmissions (e.g., if the UE determines that a previous PRACH was not successful). However, as the UE may have to switch to a second CC in order to transmit each PRACH, these repeated PRACH transmissions may cause significant interruptions and disruptions to communications on the first CC, reducing throughput on the first CC.

Accordingly, there exists a need for further improvements to the random access procedure that may be performed for SRS switching situations.

Aspects presented herein may enable the UE to use the beginning (e.g., first symbols) of UpPTS of a special subframe to transmit PRACH for SRS switching situations. For example, the UE may determine, based on one or more conditions, whether to use a beginning one or more symbols of a UpPTS for the PRACH transmission. The one or more conditions may include at least one of a configuration to use the beginning symbols of UpPTS, an indication to use the beginning symbols of UpPTS, or a capability of the UE to use the beginning symbols of UpPTS for PRACH transmission. After interrupting communication on a first CC to switch from the first CC to a second CC, the UE may transmit PRACH on the second CC based on the determination. The second CC may be a CC that is configured for downlink transmission only (e.g., a CC that is not configured for at least PUSCH/PUCCH transmission). In this manner, the UE may reduce the amount of time that communication is interrupted on the first CC due to the PRACH transmission on the second CC.

Additionally or alternatively, aspects presented herein provide a modified random access procedure that the UE can use for CCs that are configured for downlink transmission only in order to reduce the impact of switching/interruptions to the first CC. In certain aspects, after the UE transmits a PRACH (e.g., based on an initial PDCCH order), the UE may monitor for another PDCCH order before transmitting another PRACH (e.g., repeating the PRACH transmission) on a second CC. The second CC, for example, may be a CC that is configured for downlink transmission only. In this manner, the UE can avoid causing numerous interruptions to a first CC due to repeated PRACH transmissions on the second CC (typically associated with legacy random access procedures).

Aspects of the present disclosure also provide one or more enhancements for triggering and managing transmissions of SRS. Conventional mechanisms for triggering SRS transmission are generally unable to jointly trigger SRS transmissions and provide power control for the SRS transmissions. Techniques presented herein provide flexible and efficient mechanisms that allow a BS (e.g., via group downlink control information (DCI)) to jointly trigger SRS transmissions from one or more UEs, trigger SRS transmissions from multiple CCs from the same UE, and/or perform power control separately for each CC, etc. Numerous other aspects are provided.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100 in which aspects of the present disclosure may be performed.

For example, the wireless network may be a new radio or 5G network. Base station (BS) 110 may comprise a eNB, gNB, a transmission reception point (TRP), Node B (NB), 5G NB, access point (AP), new radio (NR) BS, etc.).

In aspects, as opposed to transmitting PRACH on a downlink only CC in accordance with a legacy random access procedure, UE 120 may use a modified random access procedure that reduces the impact of interruptions to a CC due to PRACH transmissions on another CC for SRS. The modified random access procedure may involve waiting for confirmation from the BS before transmitting successive PRACHs. For example, a UE 120 may monitor for a PDCCH order from the BS 110 for a PRACH transmission. The UE 120 may transmit a PRACH to the BS 110 based on information (e.g., resource allocation information, number of attempts for transmitting PRACH, transmit power, etc.) in the PDCCH order.

To transmit the PRACH, the UE 120 can interrupt communication on a first CC to switch from the first CC to a second CC, and transmit the PRACH on the second CC. The second CC may be a CC that is configured for downlink transmission (e.g., not configured for at least PUSCH/PUCCH transmissions). After transmitting the PRACH, the UE 120 may monitor for a random access response (RAR) from the BS 110. If the RAR is not detected, the UE 120 may monitor for another PDCCH order from the BS 110 before repeating the PRACH transmission. In this manner, the UE 120 can reduce the impact (e.g., interruptions) to the first CC that would otherwise be caused by automatic repeated PRACH attempts performed based on a legacy random access procedure.

Additionally, or alternatively, aspects can reduce the impact to a first CC due to switching to a second CC for PRACH transmissions by enabling the UE 120 to use the beginning symbols of UpPTS for the PRACH transmission on the second CC. For example, UE 120 may determine whether to use the beginning symbols of UpPTS for the PRACH transmission on the second CC. The determination may be based on at least one of a configuration to use the beginning symbols of UpPTS, an indication to use the beginning symbols of UpPTS, or a capability of the UE to use the beginning symbols of UpPTS for PRACH transmission. After switching to the second CC from the first CC, the UE 120 may transmit a PRACH on the second CC based on the determination. In this manner, the UE 120 can reduce the amount of time that communication is interrupted on the first CC due to PRACH transmission on the second CC.

Additionally, or alternatively, aspects presented herein enable a BS 110 to jointly trigger (e.g., via group DCI) SRS transmissions from one or more UEs 120, trigger SRS transmissions from multiple CCs from the same UE 120, and/or perform power control separately for each CC, etc. Jointly triggering SRS transmissions and/or performing power control can increase flexibility and/or reduce overhead associated with configuring SRS transmissions for UEs (relative to conventional SRS triggering mechanisms).

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
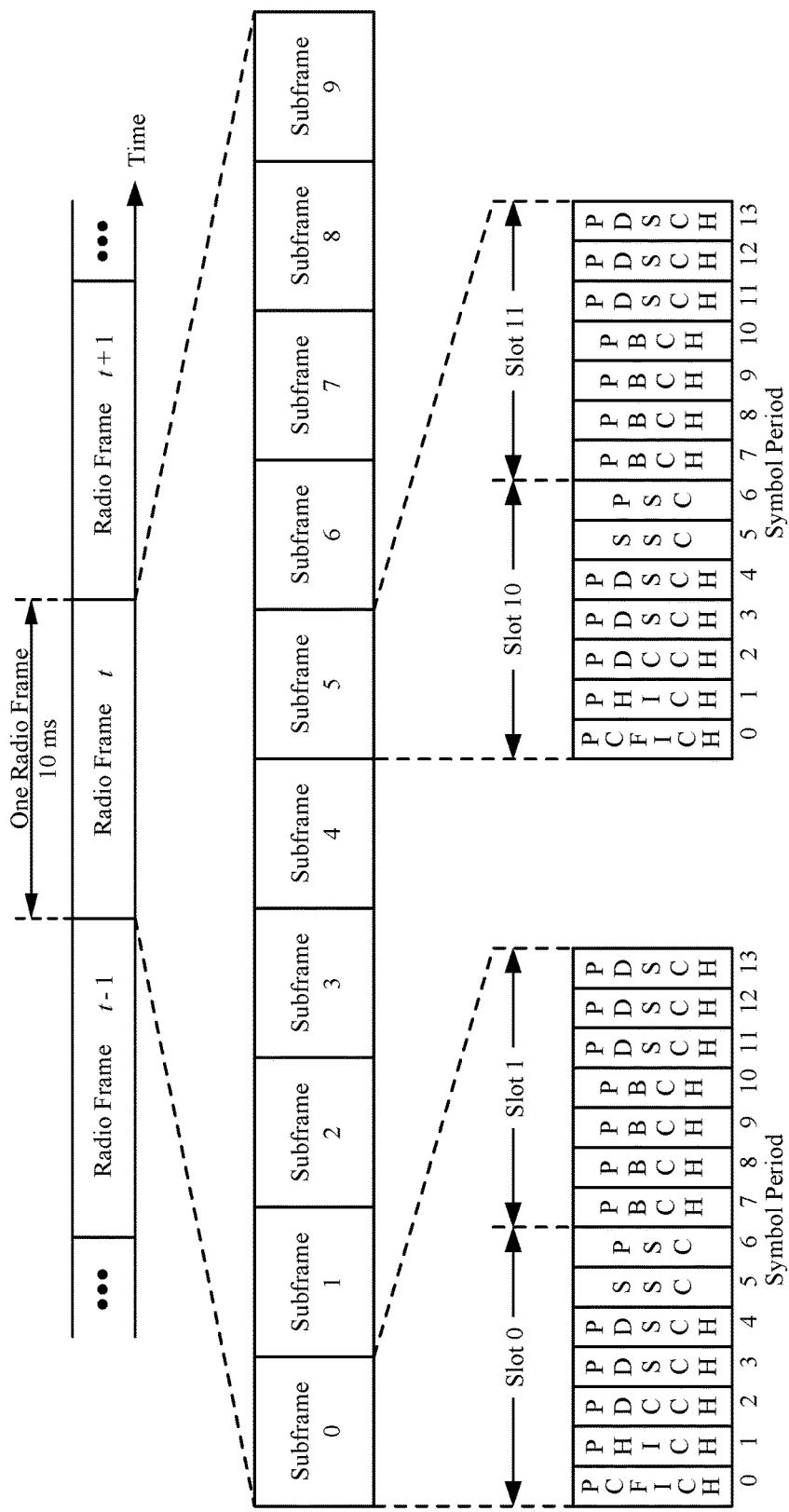
FIG. 2 is a block diagram conceptually illustrating an example downlink frame structure in a telecommunications system, in accordance with certain aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In certain systems (e.g., LTE), a BS may send a primary synchronization signal (PSS) and a secondary synchronization signal (SSS) for each cell in the BS. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The BS may send a Physical Broadcast Channel (PBCH) in symbol periods 0 to 3 in slot 1 of sub-frame 0. The PBCH may carry certain system information.

The BS may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The BS may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The BS may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The BS may send the PSS, SSS and PBCH in the center 1.08 MHz of the system bandwidth used by the Node B. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

A UE may be within the coverage of multiple BSs. One of these BSs may be selected to serve the UE. The serving BS may be selected based on various criteria such as received power, path loss, signal-to-noise ratio (SNR), etc.

In certain systems (e.g., such as NR or 5G systems), a BS may transmit these or other signals in these locations or in different locations of the subframe.

Figure 3:
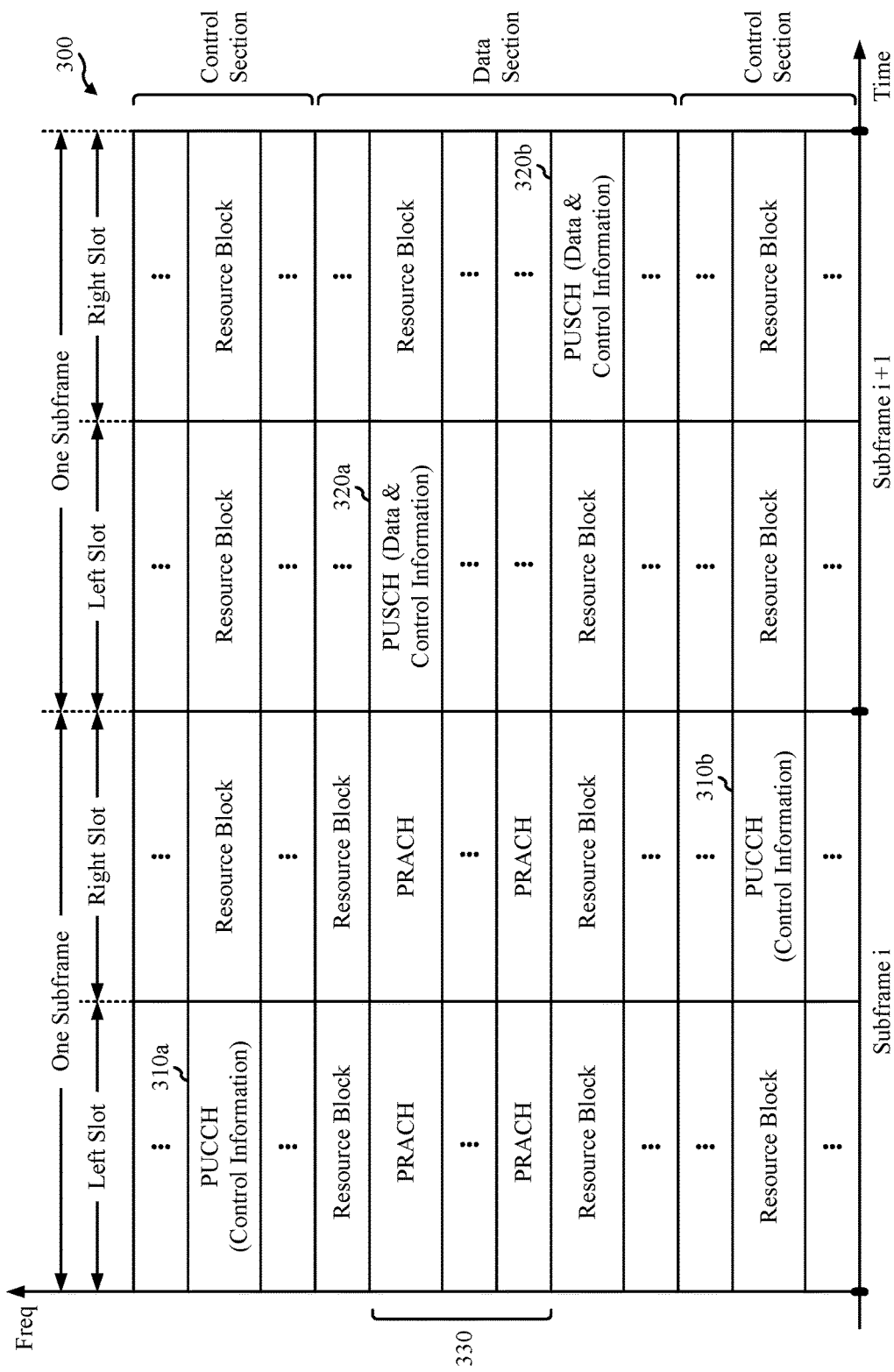
FIG. 3 is a diagram illustrating an example uplink frame structure in a telecommunications system, in accordance with certain aspects of the present disclosure.

FIG. 3 is a diagram 300 illustrating an example of an uplink (UL) frame structure in a wireless telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a BS. The UE may also be assigned resource blocks 320a, 320b in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble may occupy a bandwidth corresponding to six consecutive resource blocks. The starting frequency is specified by the network. That is, the transmission of the random access preamble may be restricted to certain time and frequency resources. There may be no frequency hopping for the PRACH. The PRACH attempt may be carried in a single subframe (1 ms) or in a sequence of few contiguous subframes and a UE can may make a single PRACH attempt per frame (10 ms). In aspects, described herein, PRACH and/or SRS may be located in additional and/or different time and/or frequency resources.

In certain systems (e.g., such as NR or 5G systems), a BS may transmit these or other signals in these locations or different locations of the subframe.

Figure 4:
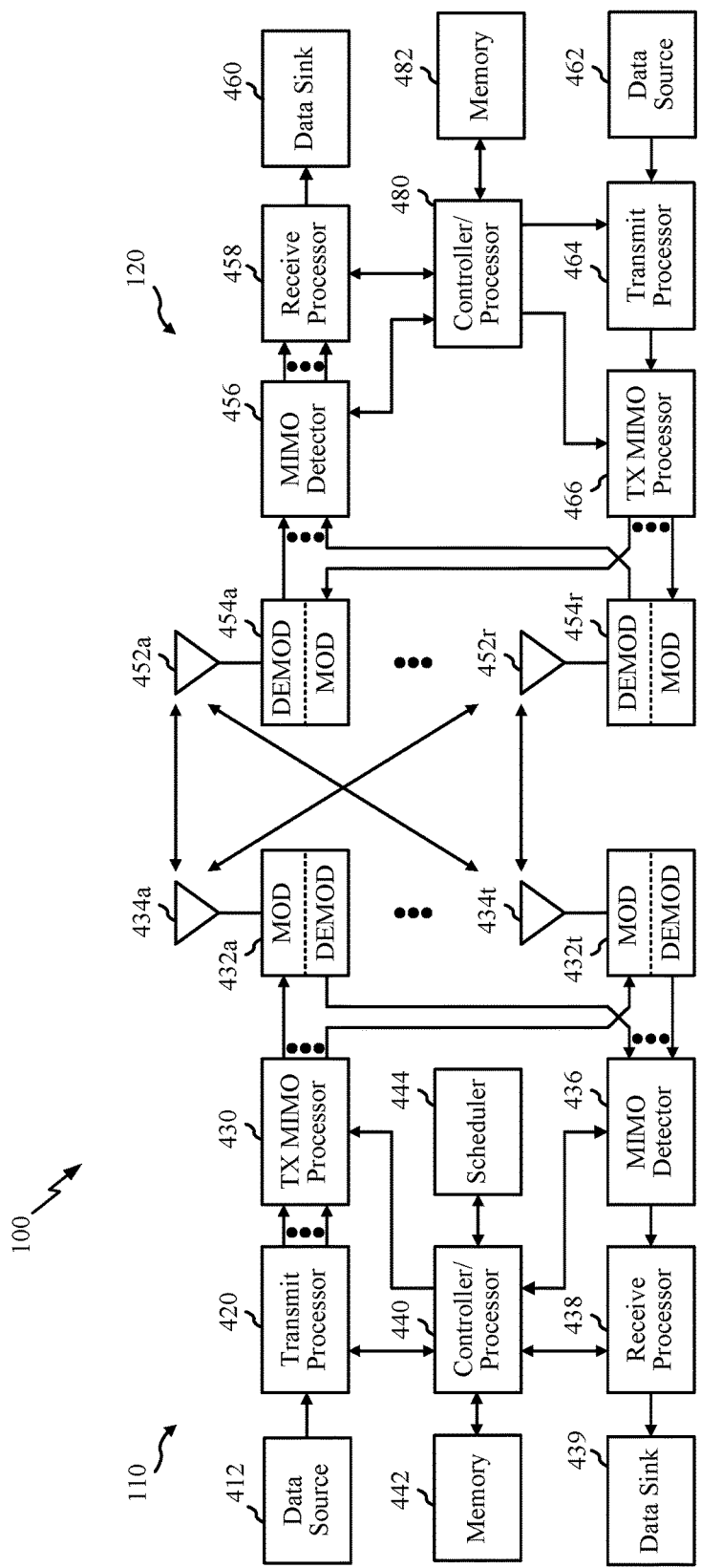
FIG. 4 is a block diagram conceptually illustrating a design of an example Node B and user equipment (UE), in accordance with certain aspects of the present disclosure.

FIG. 4 illustrates example components of the BS 110 and UE 120 of the wireless network 100 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 may be used to perform the operations described herein and illustrated with reference to FIGS. 15, 17 and 19 and/or antennas 434, processors 440, 420, 438, and/or controller/processor 440 of the BS 110 may be used to perform the operations described herein and illustrated with reference to FIGS. 16 and 18.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of the functional blocks illustrated in FIGS. 16, 18 and/or other processes for the techniques described herein. The processor 480 and/or other processors and modules at the UE 120 may perform or direct, e.g., the execution of the functional blocks illustrated in FIGS. 15, 17, 19 and/or other processes for the techniques described herein. The memories 442 and 482 may store data and program codes for the BS 110 and the UE 120, respectively. A scheduler 444 may schedule one or more UEs for data and/or control transmissions on the downlink and/or uplink.

Figure 5:
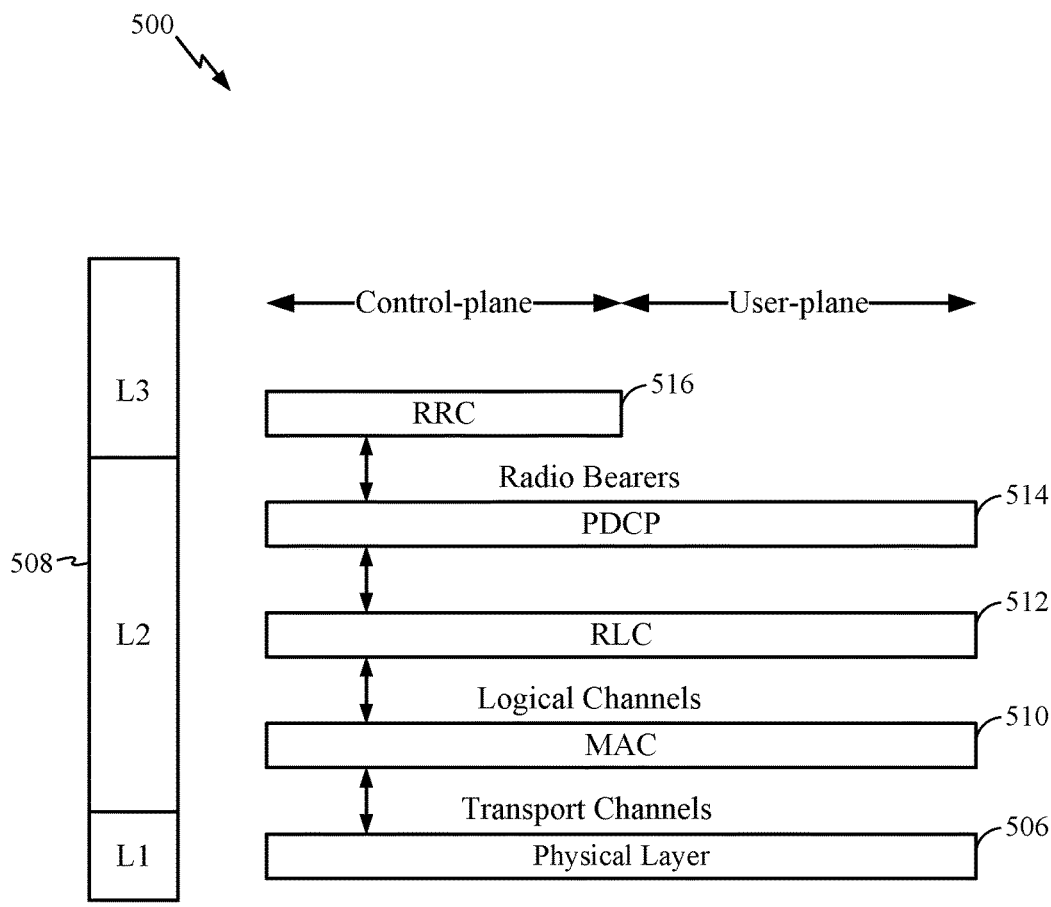
FIG. 5 is a diagram illustrating an example radio protocol architecture for the user and control planes, in accordance with certain aspects of the present disclosure.

FIG. 5 is a diagram 500 illustrating an example of a radio protocol architecture for the user and control planes in certain systems (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes, for example, a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
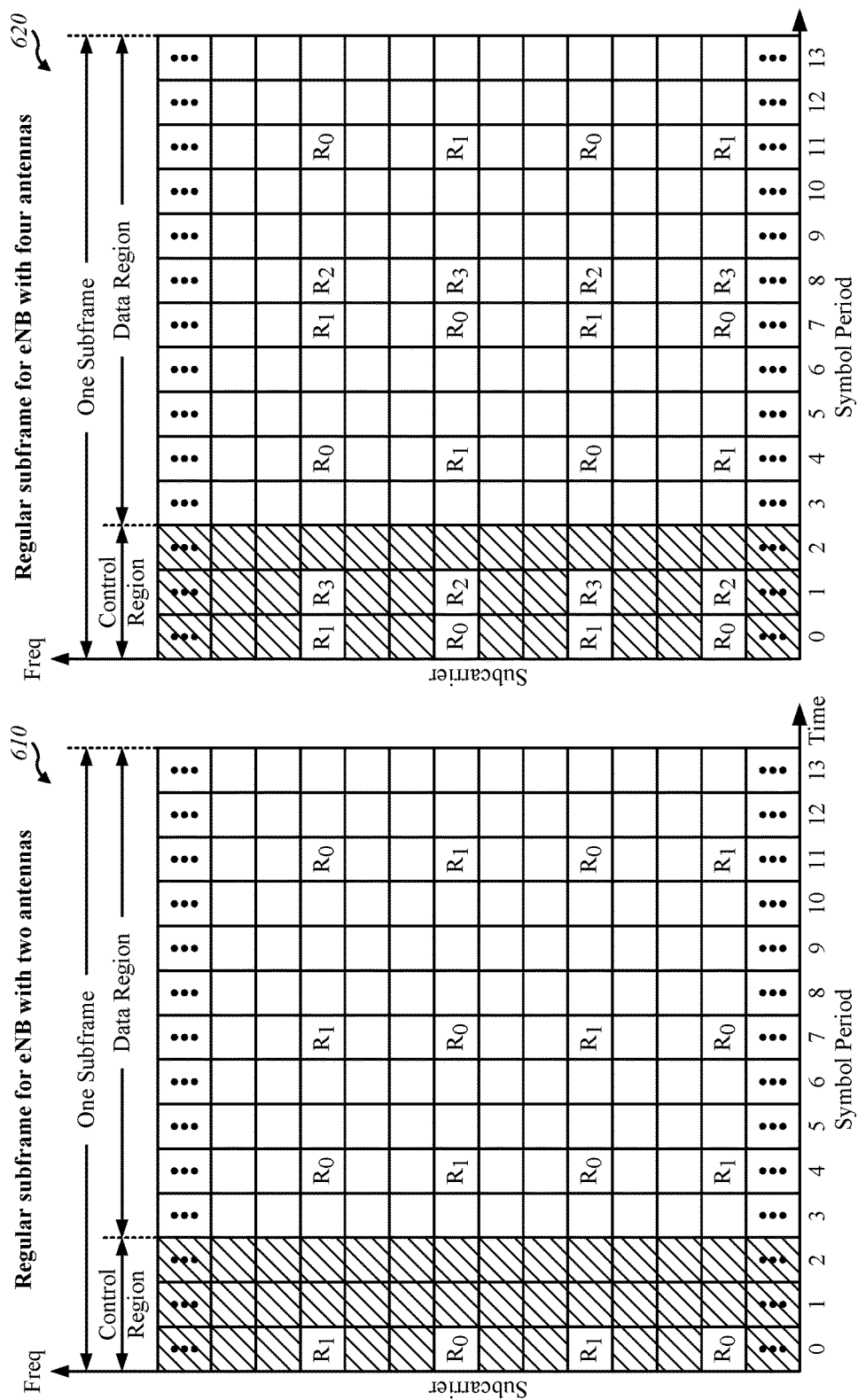
FIG. 6 illustrates an example subframe resource element mapping, in accordance with certain aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD (e.g., in LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, for example, all transmissions of the packet may be sent in subframes of a single interlace. For asynchronous HARQ, for example, each transmission of the packet may be sent in any subframe.

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
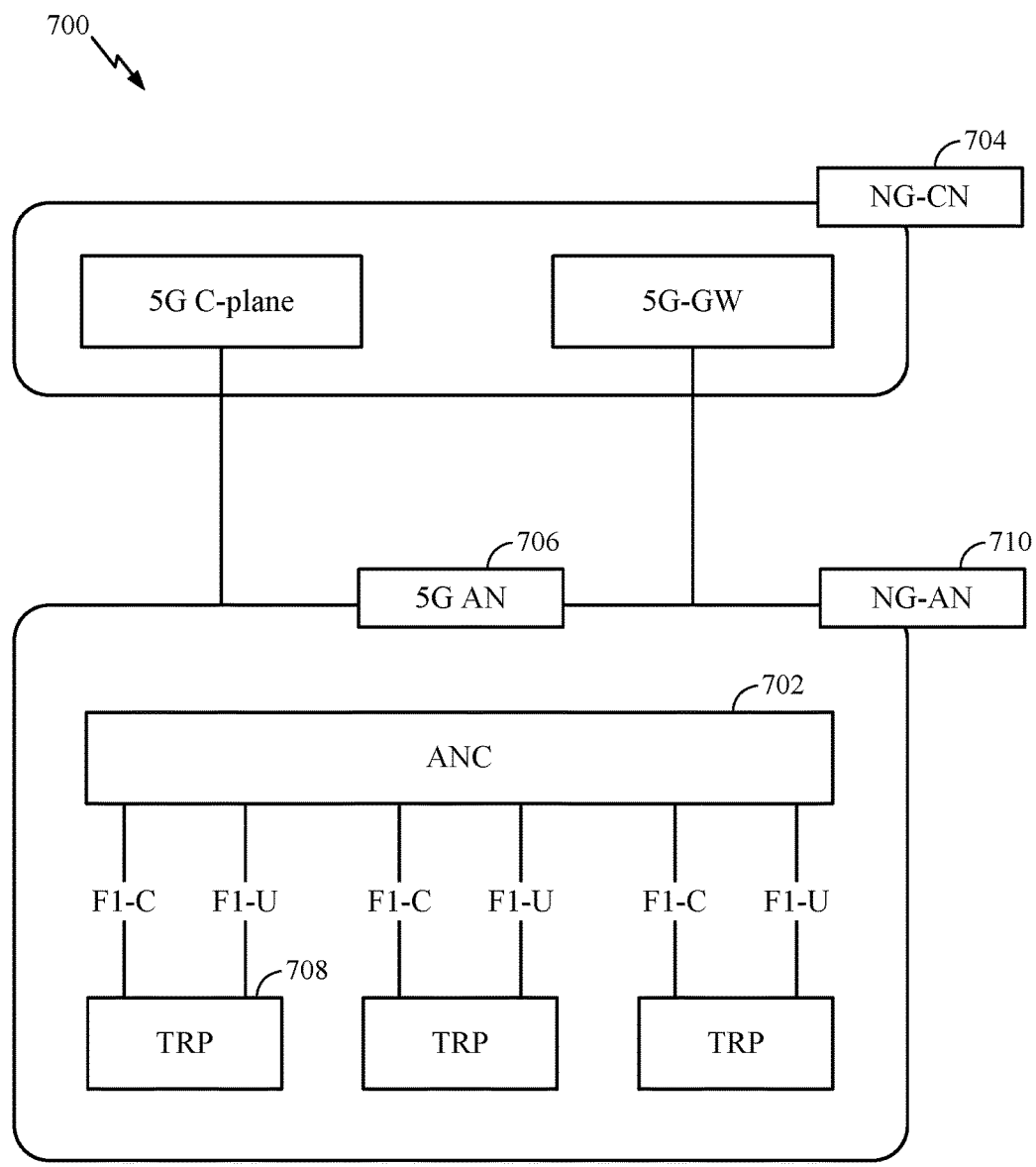
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
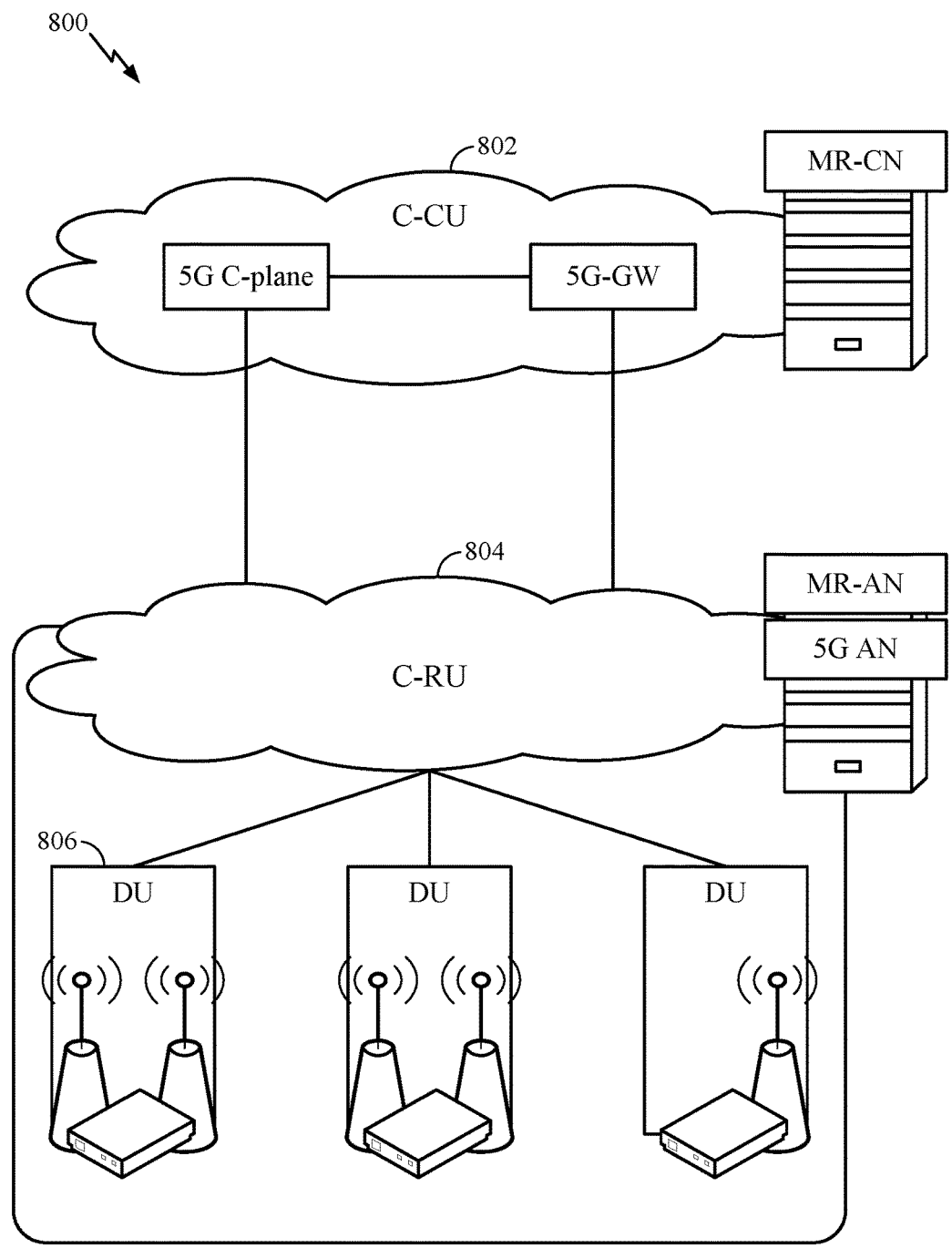
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 806 may host one or more TRPs. The DU may be located at edges of the network with radio frequency (RF) functionality.

Figure 9:
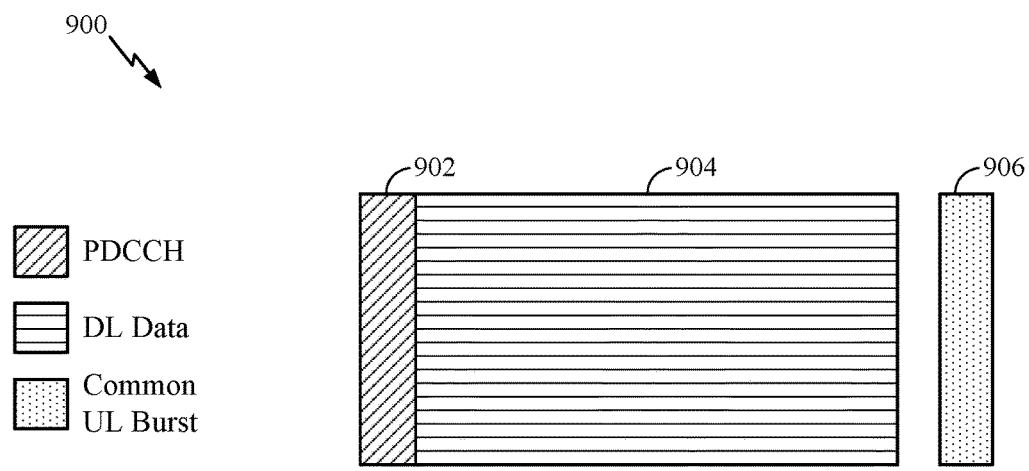
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a PDSCH.

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
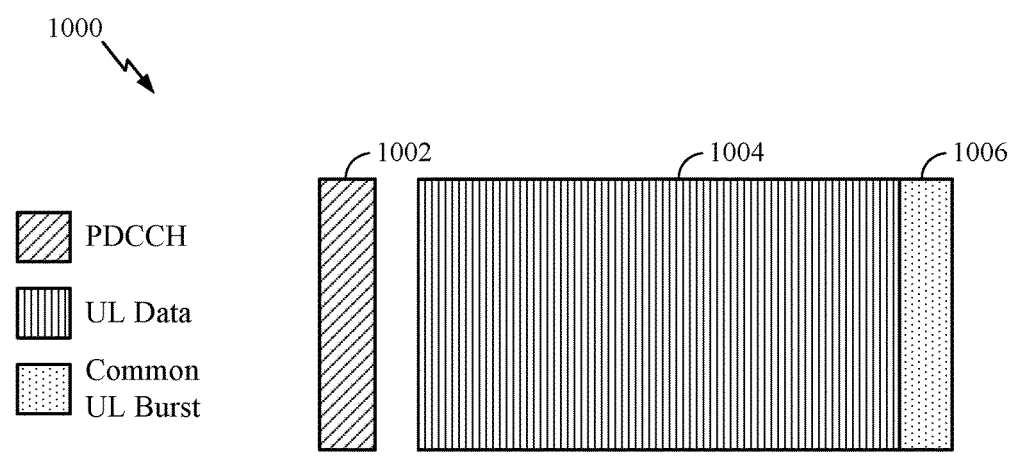
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 902 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 906 described above with reference to FIG. 9. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 11:
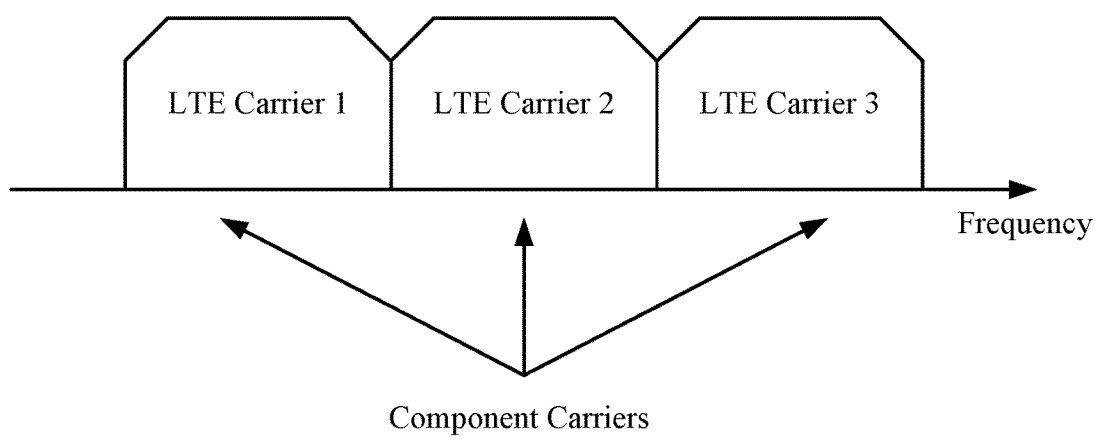
FIG. 11 illustrates an example continuous carrier aggregation type, in accordance with certain aspects of the present disclosure.
Figure 12:
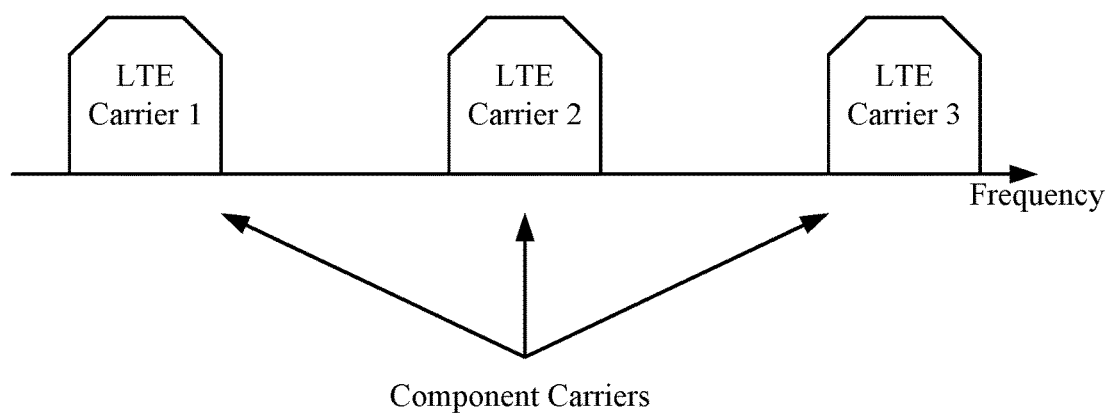
FIG. 12 illustrates an example non-continuous carrier aggregation type, in accordance with certain aspects of the present disclosure.

LTE-Advanced UEs may use spectrum of up to 20 MHz bandwidths allocated in a carrier aggregation of up to a total of 100 MHz (5 component carriers (CCs)) used for transmission in each direction. For the LTE-Advanced mobile systems, two types of carrier aggregation (CA) methods have been proposed, continuous CA and non-continuous CA, illustrated in FIGS. 11 and 12, respectively. Continuous CA occurs when multiple available component carriers are adjacent to each other (FIG. 11). On the other hand, non-continuous CA occurs when multiple available component carriers are separated along the frequency band (FIG. 12). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

In certain systems (e.g., LTE systems operating according to Release 13 of the wireless standards and greater), a UE can be configured with up to 32 CCs for CA, for example. Each CC may be up to 20 MHz in size (e.g., and may be backward compatible). Therefore, up to 640 MHz of bandwidth can be configured for a UE (e.g., 32 CC×20 MHz per CC).

The CCs in CA can be all be configured as frequency division duplexing (FDD) CCs, as all time division duplexing (TDD) CCs, or configured as a mixture of FDD CCs and TDD CCs. Different TDD CCs may have the same or different downlink uplink (DL/UL) configurations. Special subframes can also be configured differently for different TDD CCs.

In an example CA configuration, one CC can be configured as the primary CC (e.g., referred to as the Pcell or PCC) for the UE and at most one other CC can be configured as the primary secondary CC (e.g., referred to as the pScell). Only the Pcell and pScell may carry the physical uplink control channel (PUCCH). The UE may monitor common search space only on the Pcell. All other CCs may be referred to as secondary CCs (SCCs). CCs can be configured for uplink only, downlink only, or for both uplink and downlink.

SRS is a reference signal transmitted by the UE in the uplink direction. SRS may be used the BS to estimate the uplink channel quality over a wider bandwidth. In the case of TDD, SRS may also be used by the BS to estimate the downlink channel as well (e.g., due to channel reciprocity). The BS may use this information for uplink frequency selective scheduling for both downlink and uplink. However, in cases where the UE is configured with one or more aggregated CCs that are configured for downlink only (e.g., not configured for at least PUSCH/PUCCH transmission), it may not be possible to exploit channel reciprocity if the UE is not allowed to transmit SRS on downlink only carriers.

Certain systems (e.g., Release 14 LTE systems or beyond) therefore may support SRS switching to and between CCs. SRS switching may be supported where the UE has fewer CCs available for carrier aggregation of PUSCH (e.g., compared to the number of CCs available for carrier aggregation of PDSCH). In these cases, the dCCs available for SRS transmission may correspond to the CCs available for carrier aggregation of PDSCH (e.g., aggregated downlink only CCs). For example, assume a UE is configured with five aggregated CCs (CC1, CC2, CC3, CC4 and CC5), where CC1 is the PCC and is configured for downlink/uplink transmissions, and CC2-CC5 are SCCs and configured for downlink only transmissions. In this example, the CCs available for SRS transmission (in SRS switching) are SCCs CC2-CC5.

SRS switching may involve the UE (e.g., a UE having a single transmit chain) switching between transmissions on one (e.g., first) CC to SRS transmission on a different (e.g., downlink only) CC, and then back to the first CC. Continuing with the above example, the UE may perform SRS switching to one or more of the SCCs CC2-CC5 from PCC CC1 or from another one of the SCCs CC2-CC5. The SRS switching may involve a switching time for switching between transmitting on the first CC to transmitting the SRS on the other CC, and switching back to the first CC. The switching can be between different TDD CCs, different FDD CCs, TDD and FDD CCs, etc. The particular CCs the UE switches between as well as capabilities of the UE can affect the switching time involved in the SRS switching.

Figure 13:
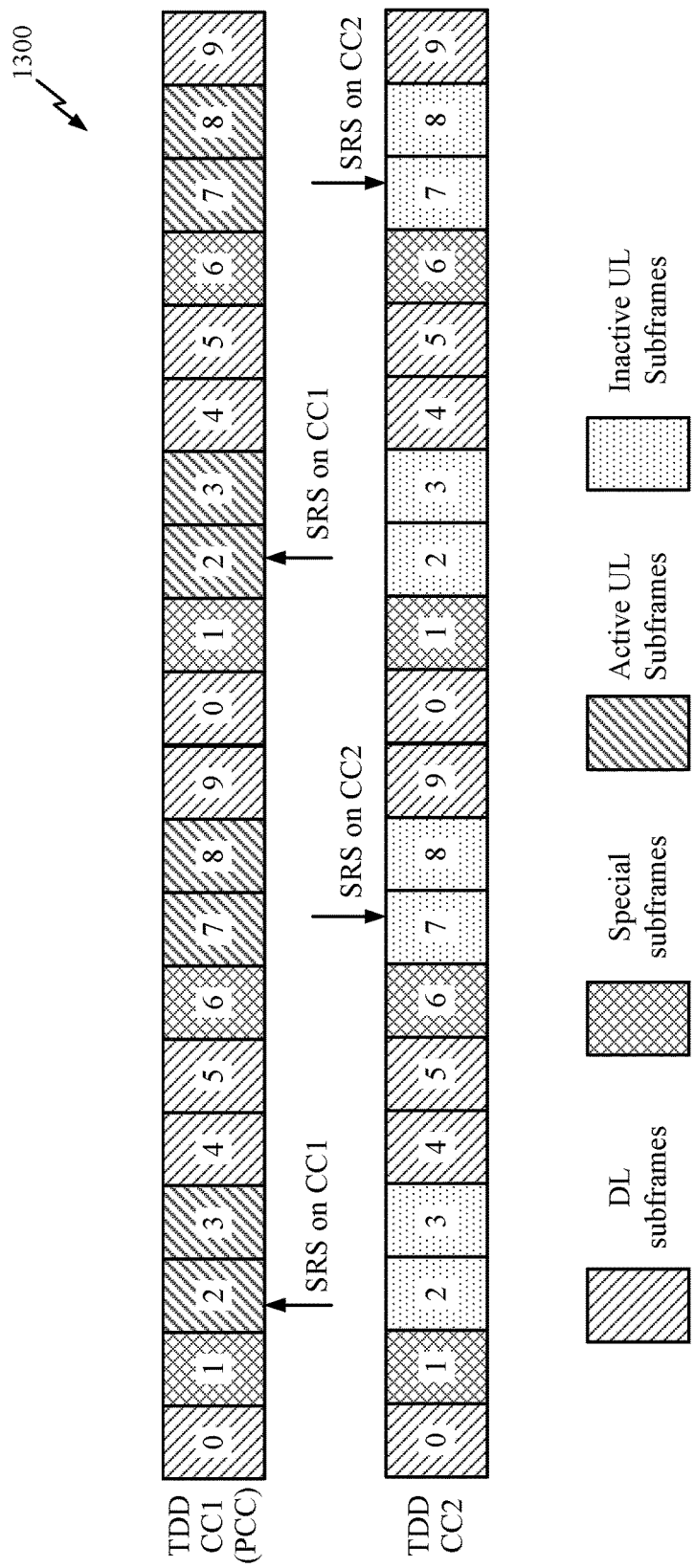
FIG. 13 is a block diagram illustrating example uplink and downlink subframes for two component carriers (CCs), in accordance with certain aspects of the present disclosure.

FIG. 13 is block diagram illustrating example uplink and downlink subframes for two CCs, in accordance with certain aspects of the present disclosure. As shown in FIG. 13, the UE may be configured with at least TDD CC1 (e.g., the PCC) and TDD CC2. CC2 may be a TDD carrier configured only for DL. That is, in one example, CC2 may not be configured for PUSCH/PUCCH transmissions. For example, as shown in FIG. 13, for TDD CC2, subframes 0, 4, 5, 9 are configured as downlink subframes; subframes 1 and 6 are configured as special subframes; and subframes 2, 3, 7, 8 are inactive uplink subframes (e.g., whereas for CC1, subframes 2, 3, 7, 8 are active uplink subframes). However, as described above, one or more of the above-described resources may be allocated and/or employed in a different manner. For example, in aspects, SRS for CC2 may be transmitted in the inactive uplink subframes (e.g., to exploit channel reciprocity) on CC2 (e.g., in subframe 7 in the example shown in FIG. 13).

Figure 14:
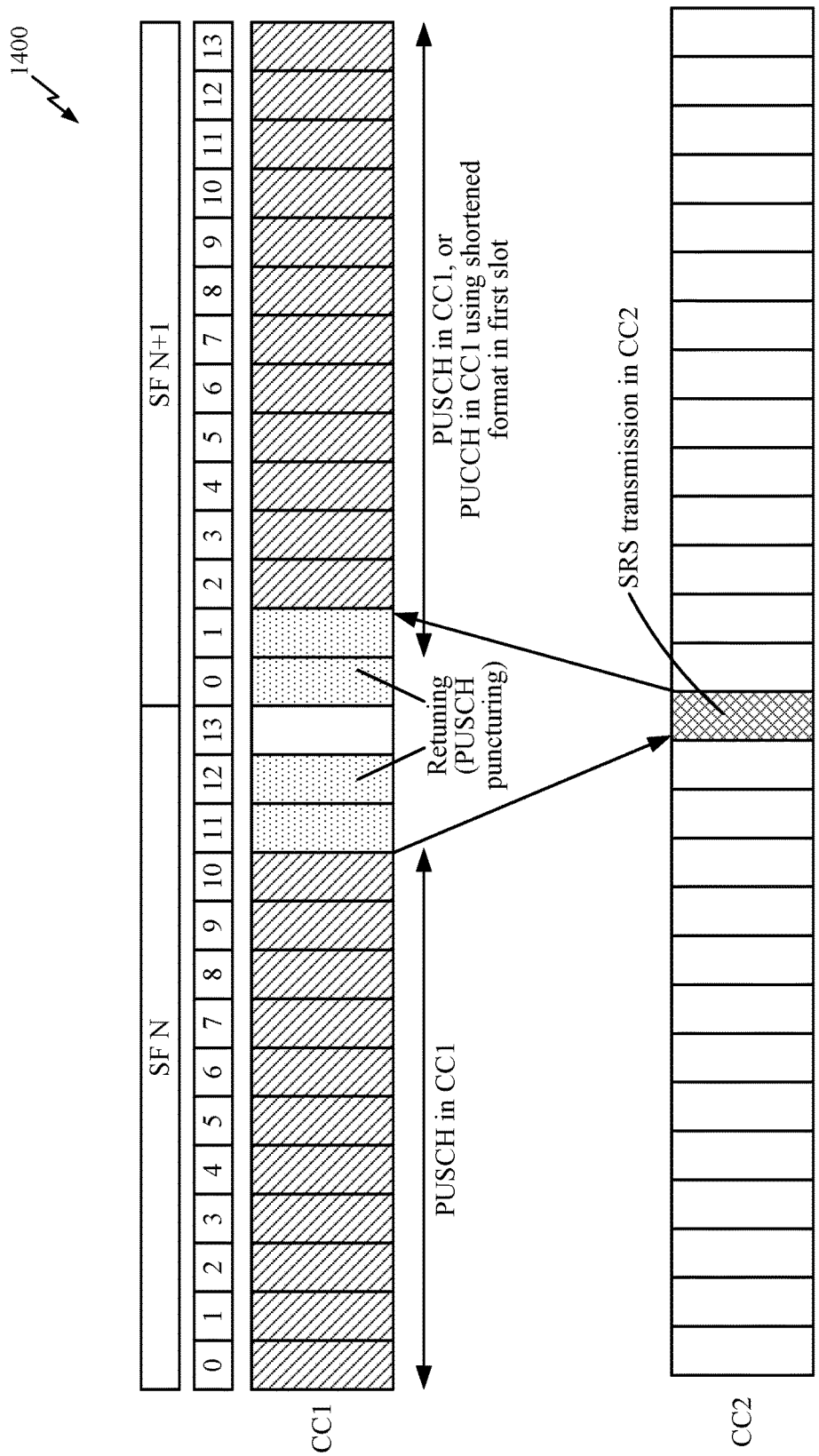
FIG. 14 is a block diagram illustrating example transmission on a first CC interrupted by sounding reference signal (SRS) transmission on a second CC, in accordance with certain aspects of the present disclosure.

In some cases, the SRS transmissions on CC2 may coincide with other transmissions, such as PUSCH or PUCCH on CC1. In such cases, the SRS transmission in CC2 may interrupt the transmission in CC1. Alternatively or additionally, SRS transmission in CC2 may be dropped. FIG. 14 is a block diagram illustrating example SRS switching with interfering, in accordance with certain aspects of the present disclosure. In the example shown in FIG. 14, the SRS transmission on CC2 may cause the UE 120 to disregard, delete, puncture, drop and/or not process one or more symbols of the PUSCH or PUCCH on CC1. For example, as shown in FIG. 14, if the UE 120 has a switching time (e.g., including retuning time) of 2 symbols, a total of 5 symbols may be disregarded, deleted, punctured, dropped and/or not processed on CC1 because of the UE's interruption of communication on CC1 to switch between CC1 and CC2 to transmit SRS on CC2.

EXAMPLE PRACH AND/OR SRS SWITCHING ENHANCEMENT

In general, SRS transmissions from UEs in the network should be orthogonal to SRS transmissions from other UEs in the network. To maintain orthogonality in the network, the SRS transmissions from the UEs to a particular BS in the network should arrive at the BS at the same time (or within a CP length). The UE, therefore, may attempt to transmit a PRACH in order to obtain an initial timing advance (TA) estimate for the transmission of SRS.

However, when the UE is configured to perform SRS switching in CA mode with a PCC and one or more downlink-only SCCs, the UE may have to transmit PRACH on the downlink-only SCC (e.g., in a similar manner that it transmits SRS on the downlink only SCC). The UE may do so, for example, in cases where the PCC for pCell and SCC for sCell belong to different timing advance groups (TAGs) and therefore have different TA values (e.g., due to the pCell associated with PCC being non-collocated with the sCell associated with SCC). In such cases, the BS (e.g., in order to establish a TA for sCell) may trigger the UE to transmit a PRACH on the sCell by transmitting a PDCCH order (e.g., on the pCell) to the UE.

However, in cases where the UE has a limited number of transmit chains (e.g., the UE may have one transmit chain), the transmission of PRACH on the sCell may interrupt communication on the pCell (e.g., in a similar manner that SRS transmissions on the sCell interrupt communication on the pCell as shown in FIG. 14). Depending on the configuration and position (e.g., symbol location within a subframe) of PRACH, this interruption can have a significant impact on the throughput in the pCell. For example, the interruption due to PRACH transmission may create additional interruption(s) in the previous and/or subsequent subframes on the pCell.

Aspects presented herein, for example, provide techniques for reducing the impact of switching due to PRACH and/or SRS transmission.

In one aspect, techniques presented herein can be used to improve the PRACH transmission in the uplink pilot time slot (UpPTS).

In certain systems, e.g., such as LTE, a subframe format may include a UpPTS. Using a 10 ms radio frame as a reference example, the 10 ms radio frame may include two half frames of equal length (e.g., 5 ms), with each half frame consisting of 10 slots or 8 slots plus three special fields: DwPTS (downlink pilot time slot), GP (guard period), and UpPTS in a special subframe. In this example, each slot may be 0.5 ms in length and two consecutive slots may form one subframe. The special subframe (including UpPTS) may be used for switching between uplink and downlink subframes, for example, in TDD operation.

In LTE Rel-13, UpPTS can be used for up to six symbols (e.g., SC-FDMA symbols). In aspects, a UE may use UpPTS to transmit PRACH, SRS, and/or PUSCH, etc. In some cases, a two to four symbol PRACH may be enough to allow the BS to determine the TA estimate. Accordingly, aspects presented herein may enable transmission of PRACH in the first symbols of UpPTS (e.g., excluding one or more of the last symbols of the UpPTS) to reduce the impact to a CC (e.g., PCC or SCC) due to switching to another CC when transmitting PRACH.

Figure 15:
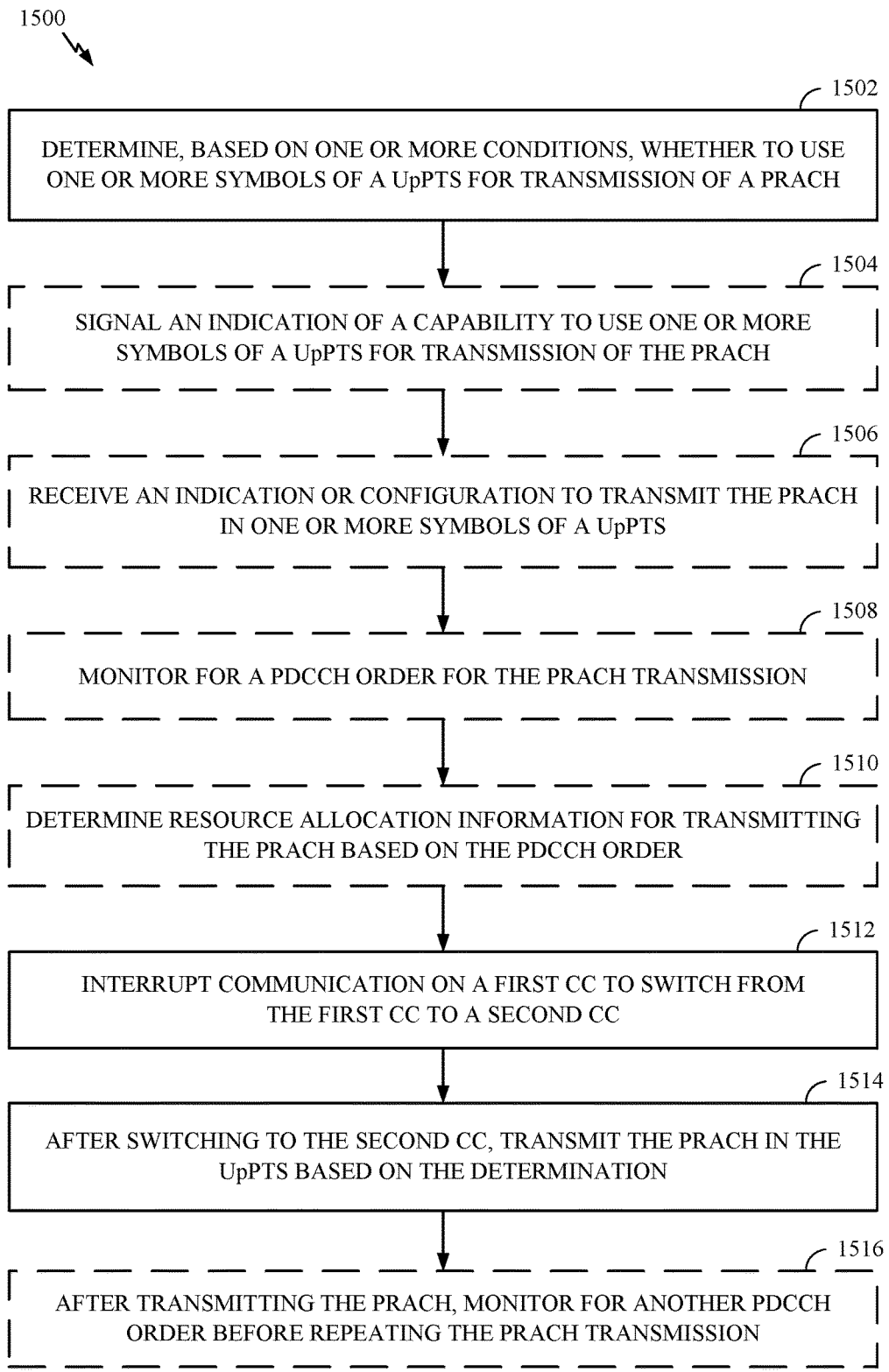
FIG. 15 is a flowchart illustrating example operations for wireless communications by a UE, in accordance with certain aspects of the present disclosure.

FIG. 15 is a flowchart illustrating example operations 1500 for wireless communications, in accordance with certain aspects of the present disclosure. The operations 1500 may be performed, for example, by a UE (e.g., UE 120). Note, the steps described in the dashed boxes (e.g., at 1504, 1506, 1508, 1510 and 1516) correspond to optional steps that may be performed as a part of operations 1500.

Operations 1500 may begin at 1502 where the UE determines, based on one or more conditions, whether to use one or more symbols of a UpPTS for transmission of a PRACH to a BS (e.g., BS 110). For example, the UE may use up to six symbols of UpPTS for a PRACH transmission. In addition, a two to four symbol PRACH may be sufficient to enable the BS to determine the uplink TA for the SCC. In some aspects, the UE may determine whether to use the first (beginning) symbols of UpPTS for the PRACH transmission on the SCC (e.g., as opposed to the last symbols of UpPTS). For example, assuming two symbols are used for PRACH, the UE may determine whether to use the first two symbols of UpPTS or any two symbols of UpPTS (excluding the last one or two symbols of UpPTS). Note that while a two symbol PRACH is used herein as a reference example, the techniques presented herein may also apply for a three or four symbol PRACH.

At 1504, the UE may signal an indication of a capability to use one or more symbols of UpPTS for transmission of a PRACH to the BS. For example, the UE may determine it has a capability (e.g., the UE may support Rel-14 or later) to transmit the PRACH in the first (e.g., at least two) symbols or symbols excluding one or more of the last (e.g., last two) symbols of UpPTS. The UE may inform the BS (e.g., signal an indication) of its capability to transmit PRACH in one or more symbols (e.g., first symbols) of the UpPTS. In one aspect, the one or more conditions (e.g., at 1502) may be based in part on whether the UE has the capability to use one or more symbols of UpPTS for a PRACH transmission.

At 1506, the UE may receive from the BS an indication or configuration to transmit the PRACH in one or more (e.g., first) symbols of UpPTS. The UE, for example, may receive the indication or configuration in response to signaling (e.g., at 1504) that it has the capability to use the first symbols of UpPTS for the PRACH transmission. In one aspect, the one or more conditions (e.g., at 1502) may be based in part on whether the UE receives an indication or configuration from the BS to use one or more symbols of UpPTS for the PRACH transmission. In one aspect, the UE may receive the indication or configuration via RRC signaling. The indication or configuration may be sent in a unicast manner as opposed to a broadcast manner.

At 1508, the UE may monitor for a PDCCH order (e.g., from the BS) for the PRACH transmission. The PDCCH order may trigger the UE to initiate a random access procedure with the BS by transmitting a PRACH. The PDCCH order may be transmitted, for example, in situations where the UE is out-of-sync with the BS, the UE needs an initial (or updated) TA to use for uplink transmissions to the BS, etc. The PDCCH order may be sent using one of one or more predetermined DCI formats. The UE, in turn, may monitor for the one or more DCI formats for the PDCCH order before transmitting the PRACH to the BS.

At 1510, the UE may determine resource allocation information for transmitting the PRACH based on the PDCCH order. For example, the PDCCH order may include at least part of the resource allocation for the PRACH. The resource allocation information may indicate at least one of a time position for the PRACH transmission (e.g., first two symbols, medium two symbols, last two symbols of UpPTS, assuming a two symbol PRACH), frequency position (e.g., the set of 6 physical resource blocks within the system bandwidth) for the PRACH transmission, and/or power control information for the PRACH transmission. In one aspect, the power control information may indicate at least one of a number of attempts for transmitting PRACH or an amount of transmission power to use for each of the number of attempts.

At 1512, the UE interrupts communication on a first CC to switch from the first CC to a second CC. For example, the UE may have a limited number of transmit chains (e.g., a single transmit chain). In such cases, the UE may have to interrupt communication on the first CC to retune its transmit chain to the second CC in order to transmit PRACH on the second CC. The UE may transmit a PRACH on the second CC in cases where the second CC is a downlink only SCC that does not have an uplink TA established (e.g., for the UE to use for a subsequent SRS transmission on the SCC).

At 1514, after switching to the second CC, the UE transmits the PRACH in the UpPTS based on the determination. For example, if the UE receives a configuration or indication to use the first symbols of UpPTS for the PRACH transmission, the UE may transmit the PRACH in the indicated first symbols of UpPTS. The UE may also transmit the PRACH according to resource allocation information received via a PDCCH order (e.g., at 1510). Transmitting PRACH in the first symbols of UpPTS on the second CC may reduce the amount of interruption to the first CC.

At 1516, after transmitting the PRACH, the UE may monitor for another PDCCH order (from the BS) before repeating the PRACH transmission. For example, after transmitting the PRACH on the second CC, the UE may tune back to the first CC (e.g., PCC) or another SCC to monitor for a RAR from the BS. If the RAR is not detected, the UE may remain on the first CC to monitor for another PDCCH order, as opposed to switching back to the second CC to automatically re-transmit a PRACH (according to a number of allowed PRACH attempts determined from the initial PDCCH order). In this manner, the UE can further reduce the amount of interruption to the first CC that may be associated with repeatedly switching to the second CC for multiple PRACH attempts.

Figure 16:
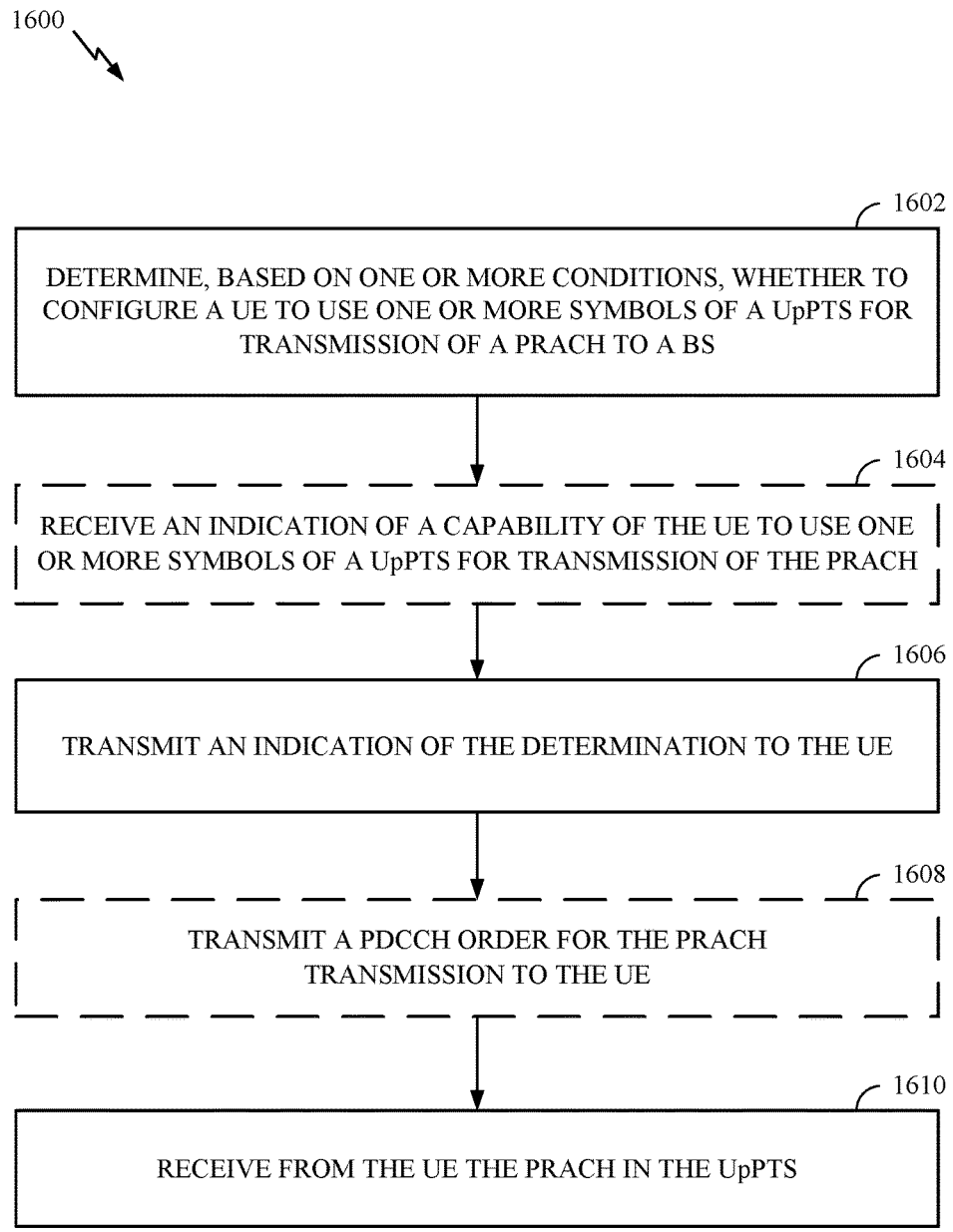
FIG. 16 is a flowchart illustrating example operations for wireless communications by a BS, in accordance with certain aspects of the present disclosure.

FIG. 16 is a flowchart illustrating example operations 1600 for wireless communications, in accordance with certain aspects of the present disclosure. The operations 1600 may be performed, for example, by a BS (e.g., BS 110). Note, the steps described in the dashed boxes (e.g., at 1604 and 1608) correspond to optional steps that may be performed as a part of operations 1600.

Operations 1600 may begin at 1602 where the BS determines, based on one or more conditions, whether to configure a UE to use one or more symbols of a UpPTS for transmission of a PRACH to the BS. For example, in some cases, a two to four symbol PRACH may be sufficient to enable the BS to determine the uplink TA for the SCC. The BS can determine whether to configure the UE to use the first (beginning) symbols of a six symbol UpPTS for the PRACH transmission on the SCC (e.g., as opposed to one or more of the last symbols of the UpPTS).

At 1604, the BS may receive an indication of a capability of the UE to use one or more (e.g., first symbols) of a UpPTS for transmission of the PRACH. The UE may inform the BS (e.g., signal an indication) of its capability to transmit PRACH in one or more symbols (e.g., first symbols) of the UpPTS. In one aspect, the one or more conditions (e.g., at 1602) may be based in part on whether the BS receives the indication of the UE's capability. In one aspect, the one or more conditions (e.g., at 1602) may be based in part on whether the UE has the capability to use one or more symbols of UpPTS for a PRACH transmission.

At 1606, the BS transmits an indication of the determination to the UE. In one aspect, the BS may transmit an indication or configure the UE to transmit PRACH in the first symbols of UpPTS after receiving an indication (e.g., at 1604) that the UE has the capability to use one or more symbols of UpPTS for a PRACH transmission. However, in some aspects, even if the BS does not receive an indication of the UE's capability, the BS may configure the UE to transmit the PRACH in one or more symbols (e.g., the first symbols) of UpPTS. The BS may configure the UE to transmit PRACH in the first symbols of UpPTS via RRC signaling. The BS may configure the UE in a unicast manner (e.g., as opposed to a broadcast manner) to transmit the PRACH.

At 1608, the BS may transmit a PDCCH order for the PRACH transmission to the UE. The PDCCH order may trigger the UE to initiate a random access procedure with the BS by transmitting a PRACH. The BS may transmit the PDCCH order in situations where the BS determines the UE is out-of-sync, the UE needs an initial (or updated) TA for the SCC, etc. The PDCCH order may be sent using one of one or more predetermined DCI formats. In some aspects, the PDCCH order may include at least part of the resource allocation for the PRACH. For example, the resource allocation may indicate at least one of a time position for the PRACH transmission, frequency position for the PRACH transmission, or power control information for the PRACH transmission. The power control information may indicate the number of allowed PRACH attempts and/or an amount of transmission power to use for each PRACH attempt.

At 1610, the BS receives from the UE the PRACH transmitted in the UpPTS. In one aspect, the BS may receive the PRACH in the UpPTS via a SCC associated with the UE that is configured for downlink transmission only. The PRACH may be transmitted in accordance with the resource allocation information from the PDCCH order transmitted to the UE (e.g., at 1608). The PRACH may enable the BS to determine a TA for the UE to use for subsequent SRS transmissions on the downlink only SCC.

Aspects presented herein also provide techniques for improving the random access (RA) procedure, for example, for SRS switching.

For example, the conventional random access procedure (e.g., for PDCCH order, contention free) generally involves the following steps: (1) the UE monitors for PDCCH order from a BS; (2) if a PDCCH order is detected, the UE transmits PRACH to the BS; (3) the UE monitors for a random access response (RAR) from the BS; (4) if a RAR is detected (e.g., with a corresponding random access preamble identifier (RAPID) field for the UE), the RA procedure is completed; (5) otherwise, if a RAR is not detected, the UE performs power ramping (e.g., increases the PRACH transmit power level and repeats the PRACH transmission according to the number of allowed PRACH attempts from the PDCCH order (e.g., step 2)).

In some cases, however, the UE may not detect a RAR from the BS after transmitting PRACH. For example, if the UE and BS are out of sync, a RAR may have been transmitted, but the UE may not be able to decode the RAR. In another example, the BS may not detect the PRACH, and therefore may not transmit a RAR to the UE. However, with the above procedure, if the UE does not detect a RAR from the BS, the UE can autonomously decide to transmit another PRACH to the BS. Each time the UE decides to transmit PRACH, the UE may have to interrupt the PCC in order to switch to a SCC to transmit the PRACH. As a result, using the above procedure may be highly inefficient in the context of SRS switching since repeated PRACH transmissions can cause significant interruptions in the PCC or the source carrier, in general. Accordingly, it may be desirable to improve the random access procedure, for example, for SRS switching.

Figure 17:
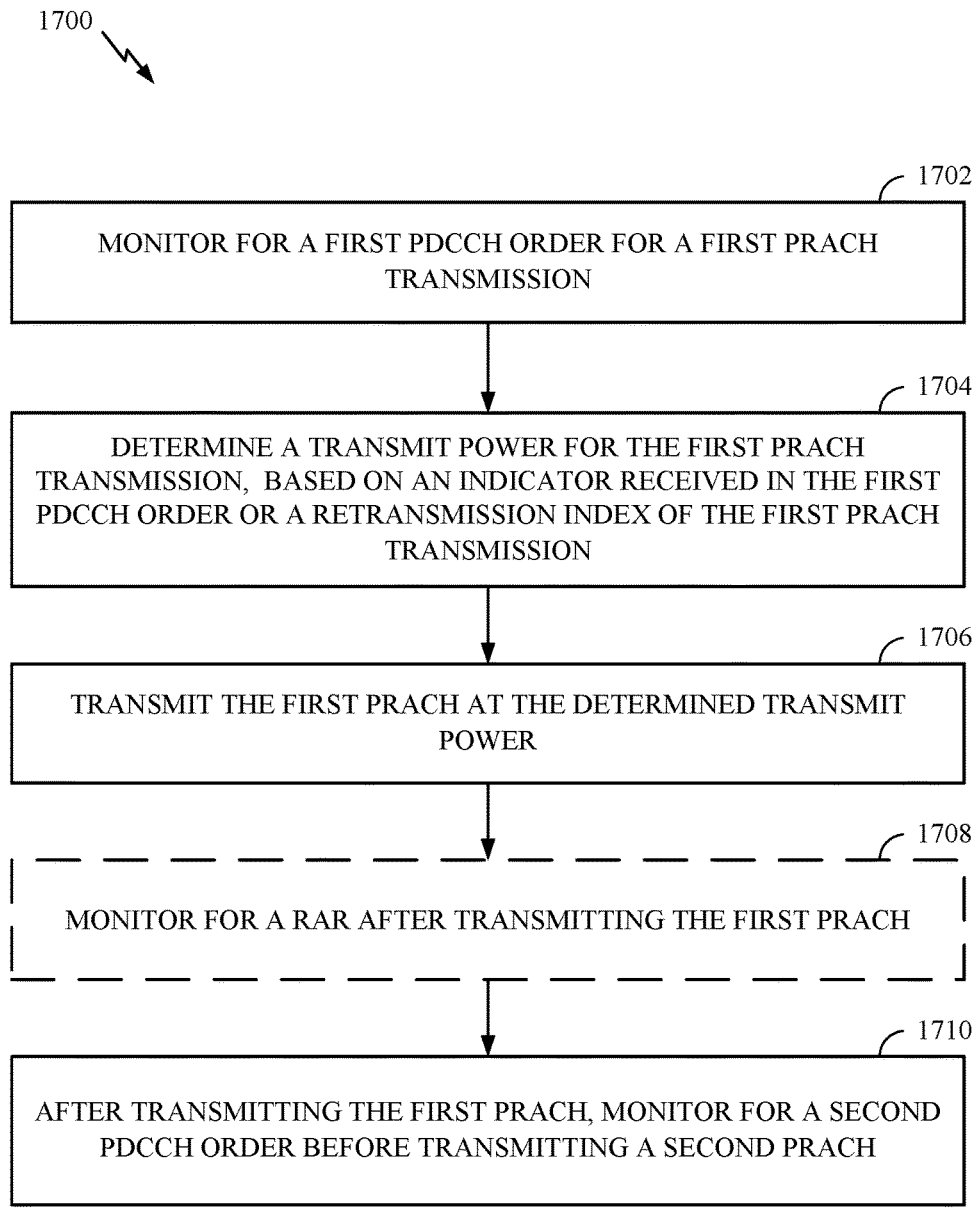
FIG. 17 is a flowchart illustrating example operations for wireless communications by a UE, in accordance with certain aspects of the present disclosure.

FIG. 17 is a flowchart illustrating example operations 1700 for wireless communications, in accordance with certain aspects of the present disclosure. The operations 1700 may be performed, for example, by a UE (e.g., UE 120). Note, the steps described in the dashed boxes (e.g., at 1708) correspond to optional steps that may be performed as a part of operations 1700.

Operations 1700 may begin at 1702 where the UE monitors for a first PDCCH order for a first PRACH transmission. The first PDCCH order may trigger the UE to transmit the first PRACH. The UE may monitor for one or more predetermined DCI formats for the first PDCCH order. The PDCCH order may include at least resource allocation information for the PRACH transmission.

At 1704, the UE may determine a transmit power for the first PRACH transmission. In one aspect, the UE may determine the transmit power based on an indicator received in the first PDCCH order. For example, the resource allocation information (of the first PDCCH order) may include at least power control information for the PRACH transmission. The power control information may indicate at least one of a number of allowed attempts (e.g., preambleTransMax) for transmitting/repeating PRACH or an amount of transmission power to use for each PRACH attempt. The power control indicator (in the first PDCCH order) may indicate an absolute power control value or a power control value relative to one or more power control values for one or more previous PRACH transmissions. In one aspect, the UE may determine the transmit power based on a retransmission index of the first PRACH transmission. For example, the UE may increase the transmission power for each PRACH attempt in accordance with a power ramp that is based in part on the retransmission index of the PRACH.

At 1706, the UE transmits the first PRACH at the determined transmit power. For example, to transmit the PRACH, the UE may interrupt communication on a first CC (e.g., PCC or SCC) to switch from the first CC to a second CC. After switching to the second CC, the UE may transmit the PRACH on the second CC. The second CC may be a CC that is configured for downlink transmission only (e.g., the CC is not configured for at least PUSCH/PUCCH transmissions).

At 1708, the UE may monitor for a RAR after transmitting the first PRACH. For example, in some aspects, the UE may switch back to the first CC or another SCC to monitor for the RAR from the BS. If a RAR is detected, the random access procedure may be completed. For example, the RAR may include a TA value for the UE to use to adjust its uplink timing for uplink transmissions (e.g., such as SRS). If a RAR is not detected, the UE may increase the transmission power and attempt another PRACH transmission (e.g., assuming the UE is below the max number of allowed retransmission attempts).

At 1710, after transmitting the first PRACH, the UE monitors for a second PDDCH order before transmitting a second PRACH. For example, in some aspects, the UE may use the legacy random access procedure described above, but instead of automatically transmitting the next PRACH (e.g., in response to not detecting a RAR), the UE may monitor for another PDCCH order from the BS before transmitting the next PRACH. That is, the UE may monitor for a RAR after transmitting the first PRACH and, if the RAR is not detected, monitor for another (e.g., second) PDCCH order instead of automatically repeating the PRACH transmission according to the number of attempts in the first PDCCH order. Once the second PDCCH order is received, the UE may transmit a second PRACH (e.g., associated with the second PDCCH order) with the increased power (determined from the second PDCCH order). In some cases, the UE may transmit the second PRACH with an increased power determined according to a power ramp step (e.g., increasing the power with respect to the previous first PRACH transmission). Put differently, using the above legacy procedure as a reference example, the UE may perform step 1 after step 5, instead of step 2 after step 5.

According to certain aspects, the UE (e.g., at 1706) may be configured to send a single PRACH transmission without ramping up the power. For example, the UE (e.g., at 1702) may be configured (via the first PDCCH order) with a parameter associated with a preamble transmission threshold such as preambleTransMax set to 1.

In certain aspects, in addition to being configured to send a single PRACH transmission, the UE may determine (e.g., at 1704) a transmit power for the single PRACH transmission. For example, in one case, the BS may RRC reconfigure the UE with a new value for P_0 or similar parameter associated with an initial transmit power for the single PRACH transmission. In one case, the BS may send a power control indicator to the UE (e.g., via the indicator received in the first PDCCH order) to indicate the transmit power value for the single PRACH transmission. The power control indicator may indicate an absolute power control value or a relative (e.g., or incremental) power control value.

According to certain aspects, the UE may receive (e.g., at 1702) an explicit indication from the BS of the number of allowable PRACH attempts and/or power control values to use for each PRACH attempt. The explicit indication, for example, may be received in cases where the UE is configured to transmit on a CC that is not configured for PUSCH/PUCCH transmissions. The UE may receive (at 1702) an order (e.g., PDCCH order) or grant within downlink control information (DCI) that indicates the number of attempts. In some cases, the number of attempts may be fixed to 1. Additionally or alternatively, in one aspect, the order or grant within the DCI may include the power control value (e.g., amount of transmission power) to use for each PRACH transmission. Such power control value may be an absolute power control value (e.g., a power control value, such as 10 dB, etc., relative to an open loop power control value) or a relative power control value (e.g., a value relative to one or more power control values for one or more previous PRACH transmissions) (e.g., cumulative across different triggers). In some cases, the power control indicator may have a sufficient number of bits (e.g., 3-4 bits) to allow for larger power control adjustments.

EXAMPLE GROUP DCI FOR SRS TRIGGERING

For certain networks (e.g., LTE), in aspects, a group DCI may jointly trigger SRS transmissions and/or perform power control of the SRS transmissions.

In general, there may be a field in the DCI grant that indicates which CCs are triggered for SRS transmissions. In one case, the UE may receive a bitmap (e.g., with one bit per CC) that indicates which CCs are triggered. Assuming the UE is configured with four CCs and receives the bitmap "0101," the UE may determine that CC2 and CC4 are triggered for SRS transmissions. In one case, the UE may receive a trigger for one carrier at a time. Thus, assuming the UE is configured with eight CCs, the UE may receive a 3 bit field within the DCI grant that indicates which of the eight CCs are triggered.

However, triggering SRS transmissions in this manner can be inefficient. For example, in the case where a bitmap is used, for UEs configured with large numbers of CCs, the bitmap field may have a large number of bits (e.g., 32 bits for a UE configured with 32 CCs). On the other hand, triggering SRS transmissions from a single CC at a time may have reduced flexibility.

Accordingly, it may be desirable to provide improved techniques for triggering SRS transmission and/or performing power control for SRS transmissions. As described below, the techniques presented herein enable a BS to trigger SRS transmissions from multiple UEs, trigger SRS transmissions from multiple CCs from the same UE at the same time, and/or perform power control separately for each CC configured for a UE.

Figure 18:
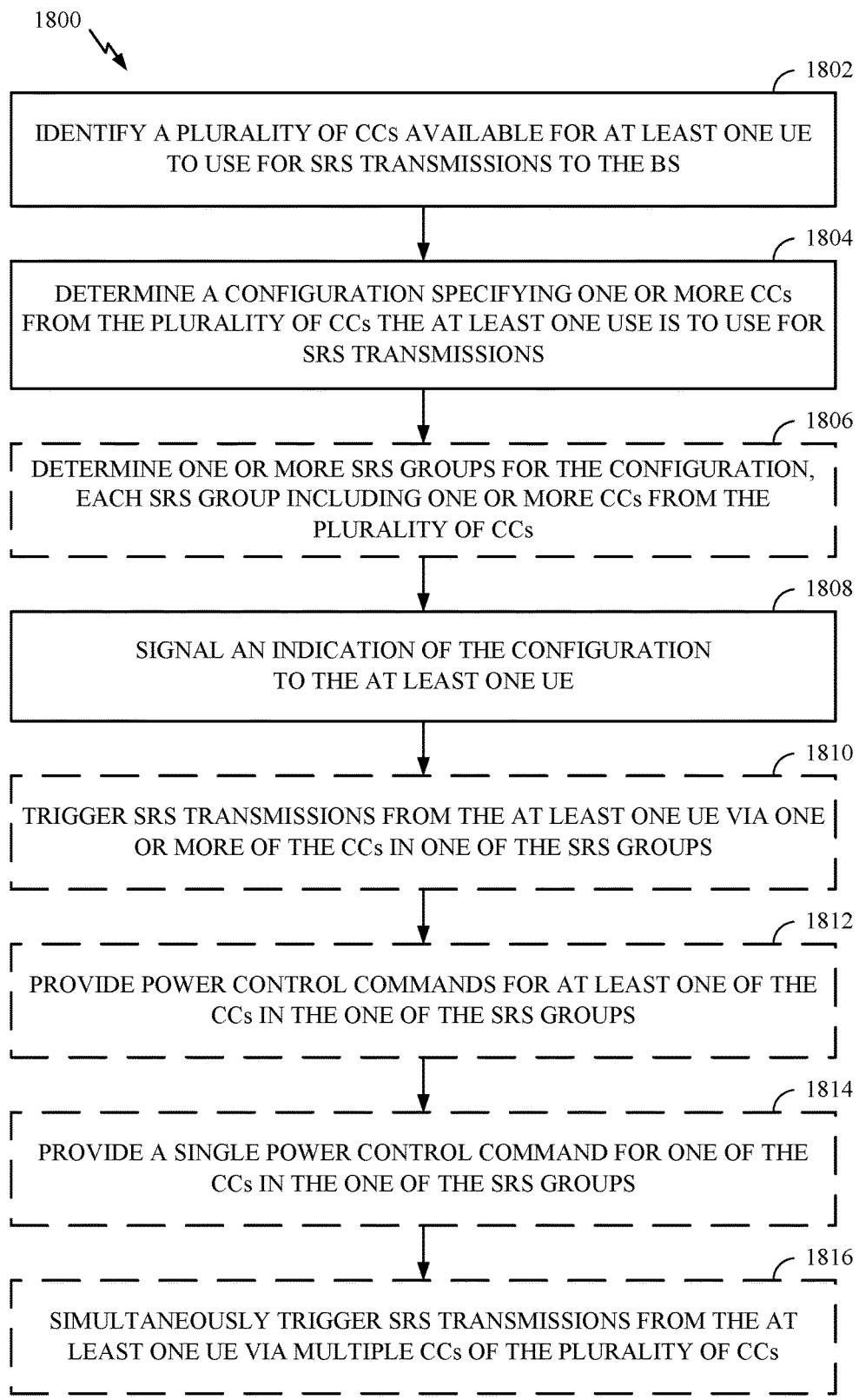
FIG. 18 is a flowchart illustrating example operations for wireless communications by a BS, in accordance with certain aspects of the present disclosure.

FIG. 18 is a flowchart illustrating example operations 1800 for wireless communications, in accordance with certain aspects of the present disclosure. The operations 1800 may be performed, for example, by a BS (e.g., BS 110). Note, the steps described in the dashed boxes (e.g., at 1806, 1810, 1812, 1814 and 1816) correspond to optional steps that may be performed as a part of operations 1800.

Operations 1800 may begin at 1802 where the BS identifies a plurality of CCs available for at least one UE to use for SRS transmissions to the BS. The UE, for example, may be configured with a plurality of aggregated CCs. Each of the CCs may be configured for downlink transmission only, uplink transmission only, or both downlink and uplink transmissions. The UE may be able to send SRS transmissions on downlink only CCs, uplink only CCs, or CCs that support both downlink/uplink transmissions. The BS may identify from the configuration which of the CCs the UE is able to send SRS transmissions on.

At 1804, the BS determines a configuration specifying one or more CCs from the plurality of CCs the at least one UE is to use for SRS transmissions. In one aspect, the configuration may specify one or more CCs for a single UE to use for SRS transmissions. In one aspect, the configuration may specify one or more CCs for multiple UEs to use for SRS transmissions. In one aspect, the configuration may specify a different one or more CCs for respective different groups of UEs to use for SRS transmissions.

At 1806, the BS may determine one or more SRS trigger groups for the configuration. Each SRS group may include one or more CCs from the plurality of CCs, identified by the BS (e.g., at 1802), that the at least one UE is to use for SRS transmissions. In some cases, each SRS group may include a different one or more CCs from the plurality of CCs. Each SRS group may have multiple SRS transmissions from the CCs in the group, and the order of the CCs may be indicated. One or more CCs in each SRS group may be CCs that are configured for downlink transmission only. In one reference example, the UE can be configured with a SRS Group 1: {CC1, CC3, CC4}, SRS Group 2: {CC4, CC2}, SRS Group 3: {CC1}, and Group 4: {CC4, CC5, CC6}. Note that the example of four SRS groups is provided as a reference example, and that a UE can be configured with any number of SRS groups.

At 1808, the BS may signal an indication of the configuration to the at least one UE. In one aspect, the BS may configure the UE with the set of SRS trigger groups (e.g., at 1806) via RRC signaling.

At 1810, the BS may trigger SRS transmissions from the UE via the one or more CCs in one of the SRS groups. Continuing with the above example of four SRS trigger groups, the BS may use a 2-bit field in the group DCI to trigger SRS transmissions in one of the four SRS groups. Assuming the 2-bit field comprises "11," the UE may be triggered to transmit SRS transmissions via CC4, CC5 and CC6 (e.g., in SRS group 4). In general, however, the size of the field may be based on the number of SRS groups configured for the UE (e.g., via RRC signaling). For example, the size of the field (e.g., in bits) in the group DCI may be equal to ceil(log 2(Ngroups)).

Additionally, at 1812, the BS may perform power control for one or more CCs in the group triggered for SRS transmissions (e.g., at 1810). For example, the BS may provide power commands for at least one of the CCs in the triggered one of the SRS groups via the group DCI, and the number of the fields for the power control commands in the group DCI may be based in part on which of the SRS groups has a largest number of CCs. Continuing with the above example of four SRS trigger groups, since the maximum number of CCs among the four groups is three CCs, the BS may use three fields within the group DCI to provide power control for CCs in the triggered group. In cases where the number of CCs in a triggered group is smaller than the number of fields in the group DCI (e.g., in the event Group 3 above is triggered), the BS may use a smaller number of the allocated fields to provide power control commands for the CCs in the triggered group (e.g., the BS may include a power control command in a single field (of the three fields in DCI) for CC1 in Group 3). In some cases, the number of fields for the power control commands may be equal to the number of CCs in the triggered SRS group. In some cases, the number of fields for the power control commands may be equal to a number of CCs in the triggered SRS group that are configured for downlink transmission only.

At 1814, the BS may alternatively provide a single transmit power command for one of the CCs in the triggered SRS group (e.g., at 1810). In one aspect, for example, the BS may indicate (e.g., via RRC signaling) which CC is affected by the transmit power command. In one aspect, the determination of which CC is affected may be implicit (e.g., according to a predefined rule or configuration). For example, the UE may implicitly determine to use the TPC for first CC in the SRS group. In one aspect, the number of transmit power commands and the corresponding CCs to which they apply may be configured by RRC.

According to certain aspects, at 1816, the BS may simultaneously trigger SRS transmissions from multiple CCs of the plurality of CCs configured for the at least one UE. In one aspect, the configuration (e.g., at 1804) may indicate multiple CCs of the plurality of CCs for the at least one UE, and the indication (e.g., at 1808) of the configuration may simultaneously trigger SRS transmissions from the at least one UE from the multiple CCs. For example, the BS may trigger SRS transmissions from the multiple CCs via one or more groups of fields in group DCI. Assuming, for example, that the BS wants to trigger 2 CCs at the same time, the BS may include 2 groups of fields in the group DCI, each group including a field to indicate which CC is triggered, and a field to indicate the TPC command for the triggered CC. For example, if a UE is configured with 8 CCs (CC1-CC8), the BS may trigger the UE to transmit SRS from CC4 via a first group, which includes a three bit field to indicate CC4 and another field with one or bits to indicate the TPC command for CC4, and trigger the UE to transmit SRS from CC5 via a second group, which includes a three bit field to indicate CC5 and another field with one or bits to indicate the TPC command for CC5. Note that the example of simultaneous transmissions from two CCs is provided as a reference example, and that a BS, using the techniques presented herein, can trigger a UE to simultaneously transmit SRS from any number of CCs.

According to certain aspects, the configuration (e.g., at 1804) may be associated with one or more group radio network temporary identifiers (G-RNTIs) configured for the at least one UE. For example, the UE may be configured with or associated with more than one G-RNTI such that different CCs and/or groups of CCs may be triggered in different G-RNTI DCI. Thus, assuming the UE is configured with two G-RNTIs, the UE may monitor for a first configuration (having a first set of SRS trigger groups) based on the group DCI associated with G-RNTI_1 and a second configuration (having a second set of SRS trigger groups) based on the group DCI associated with G-RNTI_2. In certain aspects, the UE may monitor for a G-RNTI DCI that configures the UE with a set of SRS trigger groups (e.g., as in 1806), and monitor for another G-RNTI DCI that simultaneously triggers SRS transmissions from the UE via multiple CCs of the plurality of CCs (e.g., as in 1816).

According to certain aspects, the configuration (e.g., at 1804) and/or G-RNTI configuration may be associated with a subframe configuration for the at least one UE. That is, when configuring the G-RNTI and/or the set of CCs, the configuration may be subframe dependent or subframe associated. In one reference example, the BS can trigger a first set of CCs in a first subframe, and trigger a second set of CCs in a second subframe. In one example, the BS may provide a TPC command for CC1 in a first subframe, and provide a TPC command for CC2 in a second subframe. In some cases, the position of the UE/CC (e.g., the UE/CC information) in the total number of bits may also be subframe dependent or subframe associated. Additionally or alternatively, the set of CCs and UEs present in the group DCI may be subframe dependent or subframe associated.

According to certain aspects, the UE can monitor the new group DCI for SRS triggers/TPC commands in addition to legacy DCI (e.g., DCI format 3/3A for TPC commands only). For example, the UE may receive RRC configuration signaling (e.g., via the BS at 1808) that indicates if the power control information for a given CC is in the new group DCI or in DCI 3/3A, or both. Additionally, the BS may include an additional 2-bit TPC command in the DL grant for SRS.

According to certain aspects, for the group DCI, different UEs may have different bit widths depending on their RRC configuration. For example, if UE 1 has 2 CCs and UE 2 has 4 CCs, then the bit width of UE 2 may be about twice the size of the one for UE 1.

Figure 19:
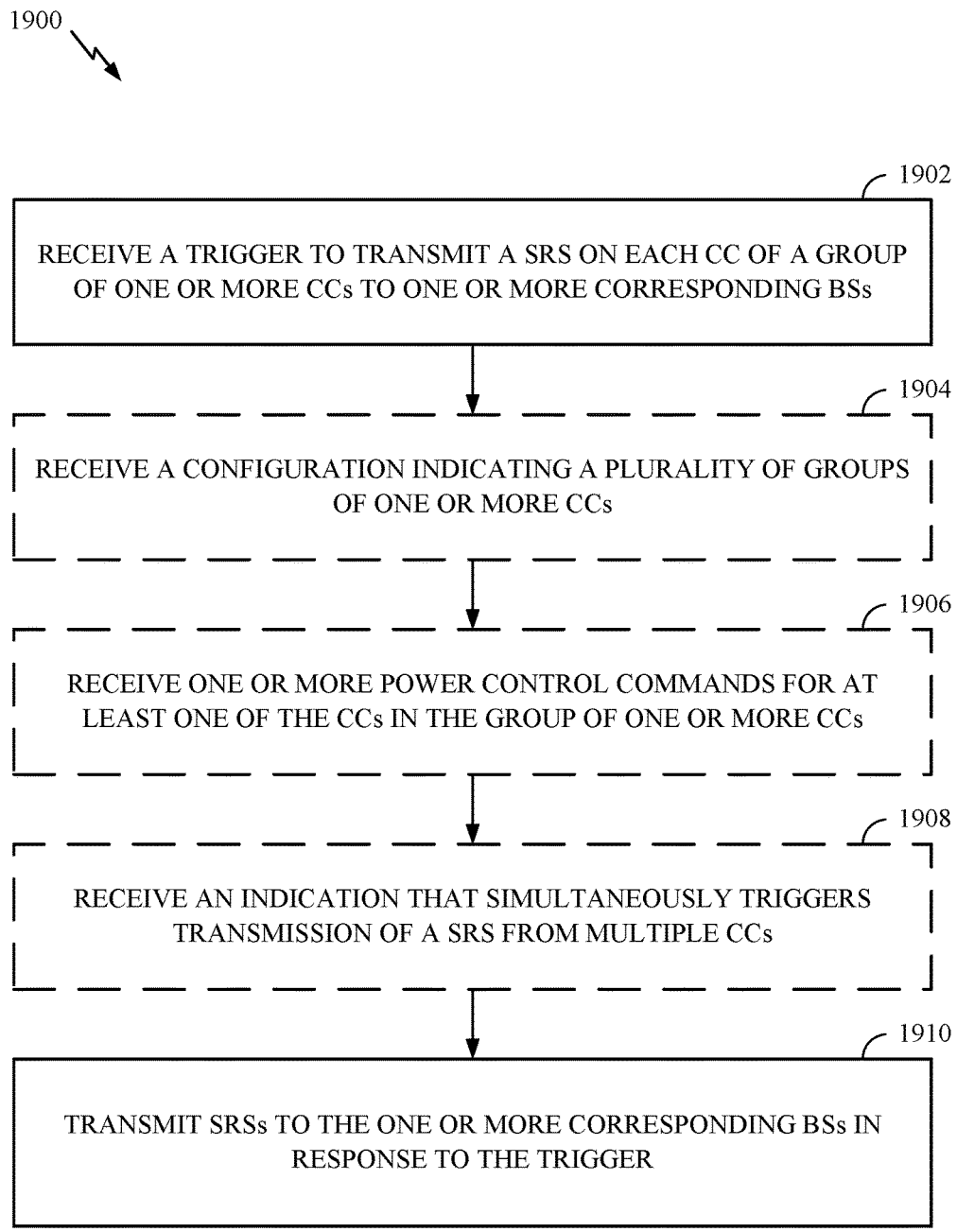
FIG. 19 is a flowchart illustrating example operations for wireless communications by a UE, in accordance with certain aspects of the present disclosure.

FIG. 19 is a flowchart illustrating example operations 1900 for wireless communications, in accordance with certain aspects of the present disclosure. The operations 1900 may be performed, for example, by a UE (e.g., UE 120). Note, the steps described in the dashed boxes (e.g., at 1904, 1906 and 1908) correspond to optional steps that may be performed as a part of operations 1900.

Operations 1900 may begin at 1902 where the UE receives a trigger to transmit a SRS on each CC of a group of one or more CCs to one or more corresponding BSs (e.g., one or more BSs 110). In one aspect, the UE may receive group DCI that triggers the UE to transmit a SRS from one or more CCs in one of multiple SRS groups configured for the UE. For example, the UE may receive a 2-bit field in the group DCI that triggers a particular group of one or more CCs. Each CC in the triggered group may be a CC that is configured for downlink transmission only, uplink transmission only, or both downlink and uplink transmissions.

At 1904, the UE may receive a configuration indicating a plurality of groups of one or more CCs. For example, the UE may receive, via RRC signaling, a set of SRS trigger groups. Each SRS trigger group may include (e.g., different) one or more CCs from a plurality of CCs that are configured for SRS transmissions. In one aspect, the trigger (e.g., in 1902) may include an indication of the group of CCs (e.g., SRS trigger group) from the plurality of groups. That is, the group DCI (e.g., in 1902) may trigger one of the SRS groups indicated in the received configuration.

At 1906, the UE may receive one or more power control commands for at least one of the CCs in the group of one or more CCs. The UE may receive the trigger (e.g., at 1902) and power control commands via an order or grant in DCI (e.g., group DCI). For example, the UE may receive power commands for at least one of the CCs in the triggered SRS group via the group DCI, and the number of fields for the power control commands in the group DCI may be based in part on which of the SRS groups configured for the UE has the largest number of CCs. In some aspects, the number of fields for the power control commands may be equal to the number of CCs in the triggered SRS group. In some aspects, the number of fields for the power control commands may be equal to a number of CCs in the triggered SRS group that are configured for downlink transmission only.

At 1908, the UE may receive an indication that simultaneously triggers transmission of a SRS from multiple CCs. In one aspect, the UE may receive one or more groups of fields in the group DCI, where each group of fields corresponds to a particular CC triggered for SRS transmission. For example, each group in the group DCI may include a field to indicate which CC is triggered and a field to indicate the TPC command for the triggered CC.

At 1910, the UE transmits SRSs to the BSs in response to the trigger. To transmit each SRS, the UE may interrupt transmission on a first CC, switch to the triggered CC(s), and transmit the SRS on the triggered CC(s). The triggered CC(s) may be a CC that is configured for downlink transmission only.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for signaling, means for configuring, means for communicating, means for providing, means for repeating, means for sending, means for increasing and/or means for indicating may include transmit processor 420, TX MIMO processor 430, and/or antenna(s) 434 of the base station 110 illustrated in FIG. 4, and/or transmit processor 464, TX MIMO processor 466, and/or antenna(s) 452 of the user equipment 120 illustrated in FIG. 4. Means for monitoring, means for receiving, means for communicating, and/or means for detecting may include receive processor 438 and/or antenna(s) 434 of the base station 110 illustrated in FIG. 4, and/or receive processor 458 and/or antenna(s) 452 of the user equipment 120 illustrated in FIG. 4. Means for monitoring, means for determining, means for transmitting, means for detecting, means for refraining, means for interrupting, means for communication, means for switching, means for receiving, means for signaling, means for repeating, means for identifying, means for triggering, means for indicating, means for providing, means for configuring, means for sending, means for increasing, and/or means for exchanging may include one or more processors or other elements, such as the controller/processor 480 of the user equipment 120 illustrated in FIG. 4, and/or the controller/processor 440 of the base station 110 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   determining a configuration specifying a plurality of sounding reference signal (SRS) groups, each SRS group comprising a subset of component carriers (CCs) that at least one user equipment (UE) is to use for SRS transmissions from a plurality of CCs available for the at least one UE to use for SRS transmissions;
   signaling an indication of the configuration to the at least one UE;
   triggering, via downlink control information (DCI), the SRS transmissions from the at least one UE via a plurality of the CCs in one of the plurality of SRS groups; and
   providing, via the DCI, one or more power control commands for the plurality of CCs in the one of the plurality of SRS groups, wherein:
   the DCI comprises (i) a first field triggering the SRS transmissions and indicating the one of the plurality of SRS groups and (ii) one or more second fields for the one or more power control commands; and
   a number of the one or more second fields is equal to a number of CCs in the plurality of CCs in the one of the plurality of SRS groups configured for downlink transmission only.

2. The method of claim 1, wherein the configuration is associated with one or more group radio network temporary identifiers (G-RNTIs) configured for the at least one UE.

3. The method of claim 1, wherein the indication of the configuration is signaled via radio resource control (RRC) signaling.

4. The method of claim 1, wherein the configuration indicates multiple CCs of the plurality of CCs for the at least one UE.

5. The method of claim 4, wherein the indication of the configuration simultaneously triggers the SRS transmissions from the at least one UE in the multiple CCs.

6. The method of claim 1, wherein each CC in the subset of CCs of each SRS group is a CC configured for downlink transmission only.

7. An apparatus for wireless communication, comprising:
   means for determining a configuration specifying a plurality of sounding reference signal (SRS) groups, each SRS group comprising a subset of component carriers (CCs) that at least one user equipment (UE) is to use for SRS transmissions from a plurality of CCs available for the at least one UE is to use for SRS transmissions;
   means for signaling an indication of the configuration to the at least one UE;
   means for triggering, via downlink control information (DCI), the SRS transmissions from the at least one UE via a plurality of the CCs in one of the plurality of SRS groups; and
   means for providing, via the DCI, one or more power control commands for the plurality of CCs in the one of the plurality of SRS groups, wherein:
   the DCI comprises (i) a first field triggering the SRS transmissions and indicating the one of the plurality of SRS groups and (ii) one or more second fields for the one or more power control commands; and
   a number of the one or more second fields is equal to a number of CCs in the plurality of CCs in the one of the plurality of SRS groups configured for downlink transmission only.

8. The apparatus of claim 7, wherein the configuration is associated with one or more group radio network temporary identifiers (G-RNTIs) configured for the at least one UE.

9. The apparatus of claim 7, wherein the indication of the configuration is signaled via radio resource control (RRC) signaling.

10. The apparatus of claim 7, wherein the configuration indicates multiple CCs of the plurality of CCs for the at least one UE.

11. The apparatus of claim 10, wherein the indication of the configuration simultaneously triggers the SRS transmissions from the at least one UE in the multiple CCs.

12. The apparatus of claim 7, wherein each CC in the subset of CCs of each SRS group is a CC configured for downlink transmission only.

13. An apparatus for wireless communication, comprising:
   at least one processor configured to:
      determine a configuration specifying a plurality of sounding reference signal (SRS) groups, each SRS group comprising a subset of component carriers (CCs) that at least one user equipment (UE) is to use for SRS transmissions from a plurality of CCs available for the at least one UE to use for SRS transmissions;
      signal an indication of the configuration to the at least one UE;
      trigger, via downlink control information (DCI), the SRS transmissions from the at least one UE via a plurality of the CCs in one of the plurality of SRS groups; and
      provide, via the DCI, one or more power control commands for the plurality of CCs in the one of the plurality of SRS groups, wherein:
         the DCI comprises (i) a first field triggering the SRS transmissions and indicating the one of the plurality of SRS groups and (ii) one or more second fields for the one or more power control commands; and
         a number of the one or more second fields is equal to a number of CCs in plurality of the CCs in the one of the plurality of SRS groups configured for downlink transmission only; and
   a memory coupled to the at least one processor.

14. The apparatus of claim 13, wherein the configuration is associated with one or more group radio network temporary identifiers (G-RNTIs) configured for the at least one UE.

15. The apparatus of claim 13, wherein the indication of the configuration is signaled via radio resource control (RRC) signaling.

16. The apparatus of claim 13, wherein the configuration indicates multiple CCs of the plurality of CCs for the at least one UE.

17. The apparatus of claim 16, wherein the indication of the configuration simultaneously triggers the SRS transmissions from the at least one UE in the multiple CCs.

18. The apparatus of claim 13, wherein each CC in the subset of CCs of each SRS group is a CC configured for downlink transmission only.

19. A non-transitory computer-readable medium having computer executable code for wireless communications by an apparatus stored thereon, the computer executable code comprising:
   code for determining a configuration specifying a plurality of sounding reference signal (SRS) groups, each SRS group comprising a subset of component carriers (CCs) that at least one user equipment (UE) is to use for SRS transmissions from a plurality of CCs available for the at least one UE to use for SRS transmissions; and
   code for signaling an indication of the configuration to the at least one UE
   code for triggering, via downlink control information (DCI), the SRS transmissions from the at least one UE via a plurality of the CCs in one of the plurality of SRS groups; and
   code for providing, via the DCI, one or more power control commands for the plurality of CCs in the one of the plurality of SRS groups, wherein:
      the DCI comprises (i) a first field triggering the SRS transmissions and indicating the one of the plurality of SRS groups and (ii) one or more second fields for the one or more power control commands; and
      a number of the one or more second fields is equal to a number of CCs in the plurality of CCs in the one of the plurality of SRS groups configured for downlink transmission only.

20. The non-transitory computer-readable medium of claim 19, wherein the configuration is associated with one or more group radio network temporary identifiers (G-RNTIs) configured for the at least one UE.

21. The non-transitory computer-readable medium of claim 19, wherein the indication of the configuration is signaled via radio resource control (RRC) signaling.

22. The non-transitory computer-readable medium of claim 19, wherein the configuration indicates multiple CCs of the plurality of CCs for the at least one UE.

23. The non-transitory computer-readable medium of claim 22, wherein the indication of the configuration simultaneously triggers the SRS transmissions from the at least one UE in the multiple CCs.

24. The non-transitory computer-readable medium of claim 19, wherein each CC in the subset of CCs of each SRS group is a CC configured for downlink transmission only.

25. A method for wireless communications by a user equipment (UE), comprising:
   receiving a configuration indicating a plurality of sounding reference signal (SRS) groups, each SRS group comprising a subset of component carriers (CCs) that the UE is to use for SRS transmissions from a plurality of CCs available for the UE to use for SRS transmissions;
   receiving, via downlink control information (DCI), a trigger to transmit a SRS on each of a plurality of CCs of one of the plurality of SRS groups to one or more base stations (BSs);
   receiving, via the DCI, one or more power control commands for the plurality of CCs in the one of the plurality of SRS groups, wherein:
      the DCI comprises (i) a first field comprising the trigger and indicating the one of the plurality of SRS groups and (ii) one or more second fields for the one or more power control commands; and
      a number of the one or more second fields is equal to a number of CCs in the plurality of CCs in the one of the plurality of SRS groups configured for downlink transmission only; and
   transmitting the SRSs to the one or more BSs in response to the trigger.

26. The method of claim 25, wherein the configuration is received via radio resource control (RRC) signaling.

27. The method of claim 25, wherein each CC in the subset of CCs of each SRS group is a CC configured for downlink transmission only.

28. An apparatus for wireless communications, comprising:
   means for receiving a configuration indicating a plurality of sounding reference signal (SRS) groups, each SRS group comprising a subset of component carriers (CCs)

that the apparatus is to use for SRS transmissions from a plurality of CCs available for the apparatus to use for SRS transmissions;

means for receiving, via downlink control information (DCI), a trigger to transmit a SRS on each of a plurality of CCs of one of the plurality of SRS groups to one or more corresponding base stations (BSs);

means for receiving, via the DCI, one or more power control commands for the plurality of CCs in the one of the plurality of SRS groups, wherein:

the DCI comprises (i) a first field comprising the trigger and indicating the one of the plurality of SRS groups and (ii) one or more second fields for the one or more power control commands; and a number of the one or more second fields is equal to a number of CCs in the plurality of CCs in the one of the plurality of SRS groups configured for downlink transmission only; and means for transmitting the SRSs to the one or more BSs in response to the trigger.

29. The apparatus of claim 28, wherein the configuration is received via radio resource control (RRC) signaling.

30. The apparatus of claim 28, wherein each CC in the subset of CCs of each SRS group is a CC configured for downlink transmission only.

31. An apparatus for wireless communications, comprising:

at least one processor configured to:

receive a configuration indicating a plurality of sounding reference signal (SRS) groups, each SRS group comprising a subset of component carriers (CCs) that the apparatus is to use for SRS transmissions from a plurality of CCs available for the apparatus to use for SRS transmissions;

receive, via downlink control information (DCI), a trigger to transmit a SRS on each of a plurality of CCs of one of the plurality of SRS groups to one or more corresponding base stations (BSs);

receive, via the DCI, one or more power control commands for the plurality of CCs in the one of the plurality of SRS groups, wherein:

the DCI comprises (i) a first field comprising the trigger and indicating the one of the plurality of SRS groups and (ii) one or more second fields for the one or more power control commands; and a number of the one or more second fields is equal to a number of CCs in the plurality of CCs in the one of the plurality of SRS groups configured for downlink transmission only; and transmit the SRSs to the one or more BSs in response to the trigger; and a memory coupled to the at least one processor.

32. The apparatus of claim 31, wherein the configuration is received via radio resource control (RRC) signaling.

33. The apparatus of claim 31, wherein each CC in the subset of CCs of each SRS group is a CC configured for downlink transmission only.

34. A non-transitory computer-readable medium having computer executable code for wireless communications by an apparatus stored thereon, the computer executable code comprising:

code for receiving a configuration indicating a plurality of sounding reference signal (SRS) groups, each SRS group comprising a subset of component carriers (CCs) that the apparatus is to use for SRS transmissions from a plurality of CCs available for the apparatus to use for SRS transmissions;

code for receiving, via downlink control information (DCI), a trigger to transmit a SRS on each of a plurality of CCs of one of the plurality of SRS groups to one or more corresponding base stations (BSs);

code for receiving, via the DCI, one or more power control commands for the plurality of CCs in the one of the plurality of SRS groups, wherein:

the DCI comprises (i) a first field comprising the trigger and indicating the one of the plurality of SRS groups and (ii) one or more second fields for the one or more power control commands; and a number of the one or more second fields is equal to a number of CCs in the plurality of CCs in the one of the plurality of SRS groups configured for downlink transmission only; and code for transmitting the SRSs to the one or more BSs in response to the trigger.

35. The non-transitory computer-readable medium of claim 34, wherein the configuration is received via radio resource control (RRC) signaling.

36. The non-transitory computer-readable medium of claim 34, wherein each CC in the subset of CCs of each SRS group is a CC configured for downlink transmission only.

* * * * *